United States Patent
Nirwal

(10) Patent No.: US 10,855,464 B2
(45) Date of Patent: Dec. 1, 2020

(54) METHODS AND APPARATUS TO MANAGE CREDENTIALS IN HYPER-CONVERGED INFRASTRUCTURES

(71) Applicant: VMWARE, INC., Palo Alto, CA (US)

(72) Inventor: Vishesh Kumar Nirwal, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 208 days.

(21) Appl. No.: 15/481,486

(22) Filed: Apr. 7, 2017

(65) Prior Publication Data
US 2018/0145955 A1 May 24, 2018

(30) Foreign Application Priority Data
Nov. 23, 2016 (IN) .............................. 201641039959

(51) Int. Cl.
*H04L 9/08* (2006.01)
*H04L 29/06* (2006.01)

(52) U.S. Cl.
CPC .............. *H04L 9/0894* (2013.01); *H04L 9/08* (2013.01); *H04L 9/0891* (2013.01); *H04L 63/06* (2013.01); *H04L 63/062* (2013.01); *H04L 63/068* (2013.01); *H04L 9/0816* (2013.01); *H04L 9/0861* (2013.01); *H04L 63/067* (2013.01); *H04L 2463/062* (2013.01)

(58) Field of Classification Search
CPC ....... H04L 9/08; H04L 9/0816; H04L 9/0861; H04L 9/0891; H04L 9/0894; H04L 63/06; H04L 63/062; H04L 63/067; H04L 63/068
See application file for complete search history.

(56) References Cited

U.S. PATENT DOCUMENTS

| | | | |
|---|---|---|---|
| 2004/0179682 A1* | 9/2004 | Soliman | H04L 9/0822 380/44 |
| 2015/0052353 A1* | 2/2015 | Kang | H04L 63/0428 713/165 |
| 2015/0086009 A1* | 3/2015 | Harjula | H04L 9/0894 380/44 |
| 2015/0222604 A1* | 8/2015 | Ylonen | H04L 63/20 713/171 |
| 2017/0132158 A1* | 5/2017 | Axnix | G06F 9/45558 |
| 2017/0141916 A1* | 5/2017 | Zhang | H04L 9/0891 |
| 2018/0006815 A1* | 1/2018 | Young | G06F 21/575 |
| 2018/0189109 A1* | 7/2018 | Nagai | G06F 9/5077 |

* cited by examiner

*Primary Examiner* — Daniel B Potratz
*Assistant Examiner* — D'Arcy Winston Straub
(74) *Attorney, Agent, or Firm* — Hanley, Flight & Zimmerman, LLC

(57) ABSTRACT

Methods, apparatus, systems and articles of manufacture manage credentials in hyper-converged infrastructures are disclosed. An example method includes establishing, by executing an instruction with at least one processor, a communication between a software defined data center manager of the hyper-converged infrastructure and a component of the hyper-converged infrastructure using first credentials included in a known hosts file. The example method also includes generating, by executing an instruction with the at least one processor, second credentials at the component in response to a power-on event detected by the software defined data center manager. The example method also includes recording, by executing an instruction with the at least one processor, the second credentials at the known host file.

21 Claims, 11 Drawing Sheets

METHODS AND APPARATUS TO MANAGE CREDENTIALS IN HYPER-CONVERGED INFRASTRUCTURES

RELATED APPLICATIONS

Benefit is claimed under 35 U.S.C. 119(a)-(d) to Foreign Application Serial No. 201641039959 filed in India entitled "METHODS AND APPARATUS TO MANAGE CREDENTIALS IN HYPER-CONVERGED INFRASTRUCTURES", on Nov. 23, 2016, by VMware, Inc., which is herein incorporated in its entirety by reference for all purposes.

FIELD OF THE DISCLOSURE

The present disclosure relates generally to software defined data centers and, more particularly, to methods and apparatus to manage credentials in hyper-converged infrastructures.

BACKGROUND

In software defined data centers (SDDCs) networking, storage, processing, and security are virtualized and delivered as a service (sometimes referred to as "Infrastructure as a Service"). In such software defined data centers, the deployment, provisioning, configuration and operation of the entire network infrastructure is abstracted from hardware and implemented using software. SDDCs are often used by businesses to create a private cloud. The private clouds are used to meet the data processing, network, and storage needs of the business/organization that operates the private cloud. SDDCs are also used to implement portions of the public cloud and, in some instances, can be used to create a hybrid cloud that includes a private cloud that accesses or uses portions of the public cloud. A primary advantage of the software defined data network is the ability to build the network using commodity hardware and software instead of having to rely on special purpose hardware/software that can be costly to maintain, upgrade, and expand. Companies that offer software defined data networking solutions (also referred to as "cloud providers") design and manufacture the commoditized hardware/software as processing units installed in standardized frames, known as racks. The racks provide efficient use of floor space by allowing the processing units to be stacked vertically. The racks may additionally include other components of a cloud computing environment such as storage devices, networking devices (e.g., switches), etc.

DETAILED DESCRIPTION

Figure 1:
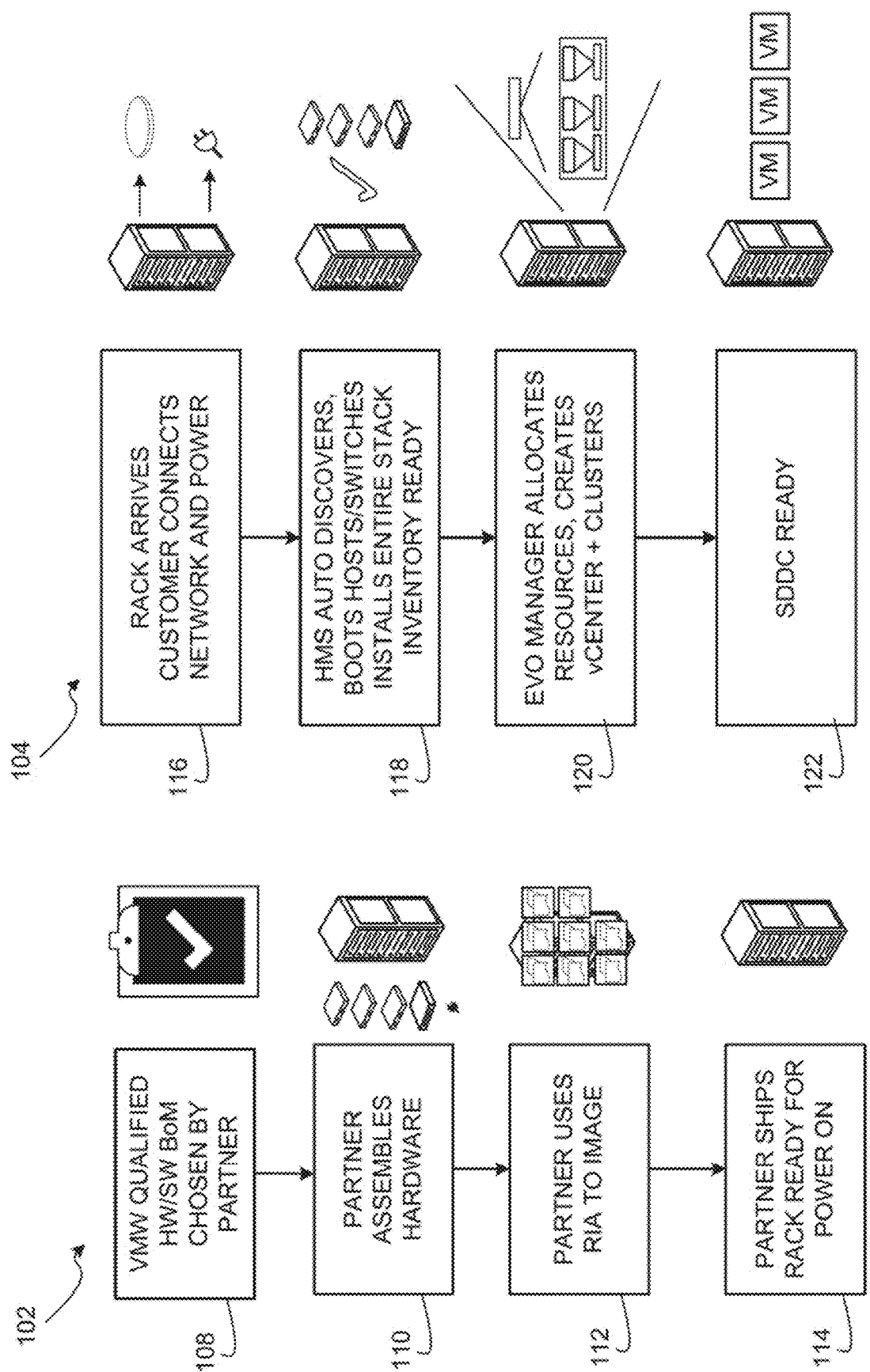
FIG. 1 depicts example processes that may be used to deploy hyper-converged infrastructures for use in examples disclosed herein to manage credentials in such hyper-converged infrastructures.

Cloud computing is based on the deployment of many physical resources across a network, virtualizing the physical resources into virtual resources, and provisioning the virtual resources for use across cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. patent application Ser. No. 11/903,374, entitled "METHOD AND SYSTEM FOR MANAGING VIRTUAL AND REAL MACHINES," filed Sep. 21, 2007, and granted U.S. Pat. No. 8,171,485, and U.S. patent application Ser. No. 14/105,066, entitled "METHODS AND APPARATUS TO MANAGE VIRTUAL MACHINES," filed Dec. 12, 2013. U.S. patent application Ser. No. 11/903,374, U.S. patent application Ser. No. 11/903,374 and U.S. patent application Ser. No. 14/105,066 are hereby incorporated herein by reference in their entirety.

Pre-packaged racks are available to businesses that want to install/deploy a private cloud. The pre-packaged racks include a variety of pre-installed software files. One such set of pre-installed software files execute to operate as a software defined data center (SDDC) manager. The SDDC manager (also referred to as a "virtual rack manager" (VRM)) is adapted to deploy and configure a management cluster to manage the operation of the private cloud (also referred to herein as a "hyper-converged infrastructure"). The management cluster performs non-production related operations for the hyper-converged infrastructure such as user-authentication, network security, network management, etc. In a hyper-converged infrastructure that is created using multiple physical racks, each physical rack is provided SDDC manager and a credentials manager. It will also be appreciated that examples disclosed herein facilitate managing numerous physical racks in a hyper-converged infrastructure using SDDC management techniques that involve SDDC managers of the numerous physical racks communicating with one another to elect a primary SDDC manager for the entire hyper-converged infrastructure. In this manner, the primary SDDC manager can manage physical resources in its own physical rack and delegate instructions to secondary SDDC managers of other physical racks so that those secondary SDDC managers can manage physical resources of their corresponding physical racks while cross-rack activities, processes, and/or data are coordinated and/or monitored by the primary SDDC manager to facilitate providing virtual and/or cloud services using the hyper-converged infrastructure.

To facilitate communication between the resources of the hyper-converged infrastructure, disclosed examples use a secure shell (SSH) communication interface. Example methods, apparatus, systems and articles of manufacture described herein implement an SDDC manager having a credentials manager that includes a known hosts file installed on each rack. The instance of the known hosts file installed on each rack includes all of the resources that the SDDC manager is authorized to communicate with. During setup of the rack, the credentials stored in the known hosts file are default credentials. Examples disclosed herein automate rotating (e.g., updating and replacing) the credentials during initialization (e.g., setup) of the SDDC manager, for example, at a customer site. For example, in response to a power-on event, the credentials manager establishes communications with a resource in the hyper-converged infrastructure and instructs the resource to create new credentials (e.g., via a SSH key command "ssh-keygen"). The credentials manager then updates its instance of the known hosts file to include the new credentials.

In some instances, the known hosts file may become corrupt or unavailable. To maintain communication abilities with the other resources in the hyper-converged infrastructure, the credentials manager also records an encrypted version of the credentials in a keys database. For example, when a credentials manager retrieves new credentials from a resource, the credentials manager records a version of the credentials in the known hosts file and an encrypted version of the of the credentials in the keys database. In the illustrated example, the keys database maintained by the primary SDDC manager is used as a shared data store by the SDDC managers. For example, when a secondary SDDC manager rotates credentials for a resource, the credentials manager of the secondary SDDC manager records a version of the credentials in the instance of the known hosts file installed on the secondary SDDC manager and an encrypted version of the credentials in the shared keys database of the primary SDDC manager.

To further improve security during communications, disclosed examples utilize a strict host key checking mechanism. The strict host key checking mechanism prevents unauthorized resources from communicating with the SDDC manager and/or the resources of the corresponding physical rack. For example, when a communication request is received at the SDDC manager, the credentials manager confirms if the resource and the credentials provided in the request are included in the instance of the known hosts file installed on the SDDC manager. If the resource and/or credentials are not included (e.g., are unknown to the credentials manager), the communication request is rejected. Implementing the strict host key checking mechanism reduces the risk of successful attacks, such as man-in-the-middle attacks, on the hyper-converged infrastructure.

However, to implement the strict host key checking mechanism, it is necessary for the known hosts file to be up-to-date with all known and authorized resources and credentials. Disclosed examples implement a synchronization operation to repopulate the known hosts file with the authorized resources and credentials from the keys database.

In some examples, the credentials manager performs the synchronization operation as part of the rack initializing. For example, the SDDC manager may reboot as part of the initializing and the credentials manager may synchronize the instance of the known hosts file installed at the SDDC manager after the reboot. In some examples, the credentials manager may synchronize the known hosts file in response to a change detected in the keys database. For example, a secondary SDDC manager may add a new resource and credentials to the keys database during an initializing operation of a second rack. In some examples, the secondary SDDC manager sends a message to the primary SDDC manager that the keys database has been updated. The credentials manager of the primary SDDC manager then performs a synchronization operation to update the instance of the known hosts file installed on the primary SDDC manager to include the new resource and credentials information.

FIG. 1 depicts example processes 102 and 104 that may be used to deploy a hyper-converged infrastructure for use in examples disclosed herein to manage credentials in such hyper-converged infrastructures. For example, the processes 102, 104 of FIG. 1 may be used to prepare example physical racks 202, 204 of FIG. 2 to deploy example hyper-converged infrastructure 206 of FIG. 2. In the illustrated example, the process 102 is a partner process that is implemented by a system integrator to prepare the physical racks 202, 204 for distribution to a customer. For example, a system integrator receives and fulfills customer orders for computing hardware. The system integrator obtains computer hardware and/or software from other suppliers (e.g., hardware supplier (s)), and assembles individual hardware components and/or software into functional computing units to fulfill customer orders. Alternatively, a system integrator may design and/or build some or all of the hardware components and/or software to be used in assembling computing units. According to the illustrated example, the system integrator prepares computing units for other entities (e.g., businesses and/or persons that do not own/employ and are not owned/employed by the system integrator). Alternatively, a system integrator may assemble computing units for use by the same entity as the system integrator (e.g., the system integrator may be a department of a company, wherein the company orders and/or utilizes the assembled computing units). In some examples, a system integrator is an entity independent of equipment manufacturers such as white-label equipment manufacturers that provide hardware without branding. In other examples, a system integrator is an original equipment manufacturer (OEM) partner or original device manufacturer (ODM) partner that partners with OEMs or ODMs (e.g., non-white label equipment manufacturers) that provide brand-labeled hardware. Example OEM/ODM hardware includes OEM/ODM Servers such as Hewlett-Packard® (HP) servers and Lenovo® servers, and OEM/ODM Switches such as Arista switches, and/or any other OEM/ODM servers, switches, or equipment that are labeled by the original manufacturers.

Figure 2:
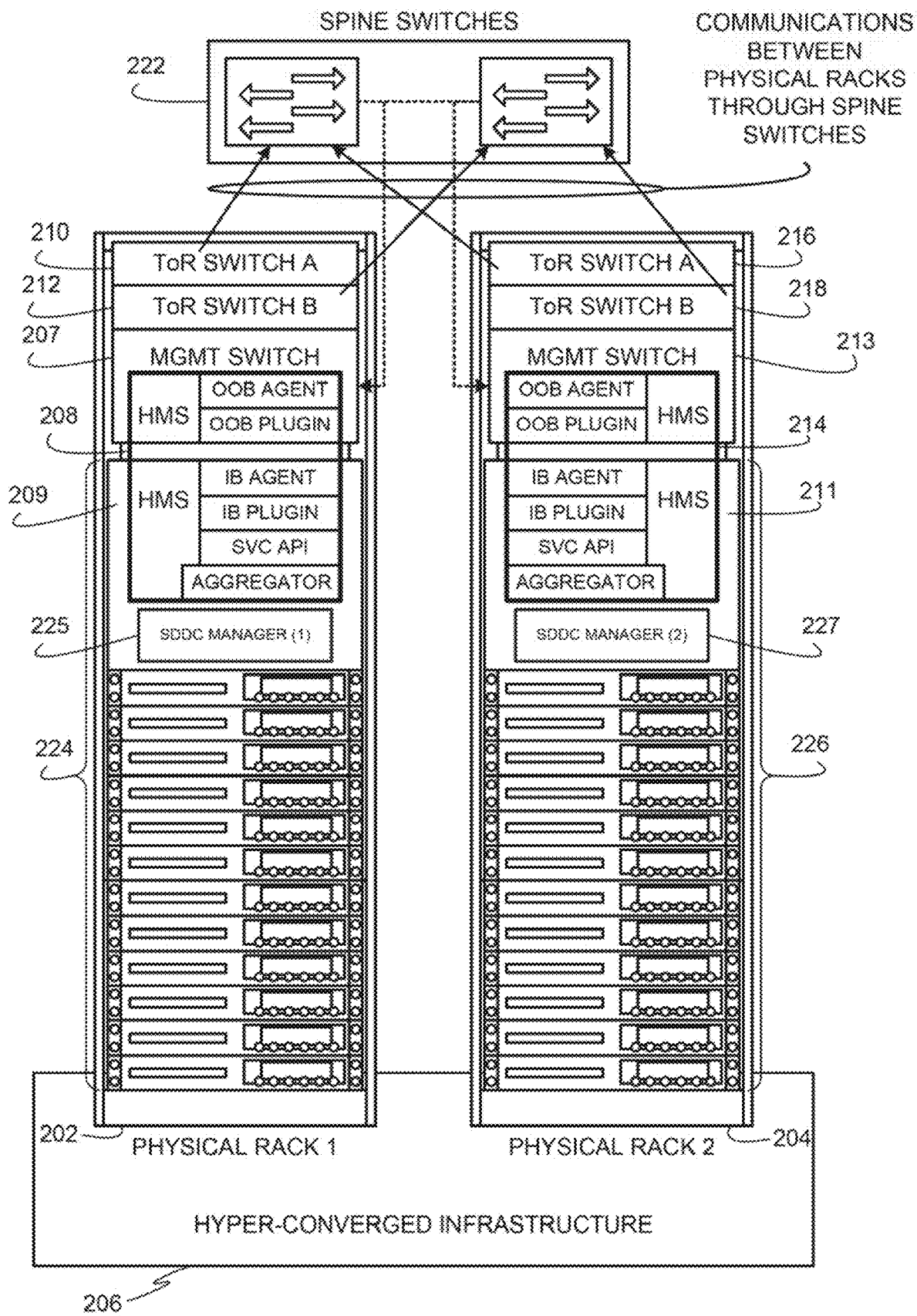
FIG. 2 depicts example physical racks in an example hyper-converged infrastructure deployment.

The example process 104 is to be performed by a customer to startup the physical racks 202, 204 (FIG. 2) prepared by the system integrator to deploy the hyper-converged infrastructure 206 (FIG. 2) at the customer's site. As used herein, the term customer refers to any person and/or entity that receives and/or operates the computing units supplied by a system integrator. The example process 102 is implemented by a system integrator to assemble and configure the physical racks 202, 204 ordered by a customer. For example, the physical racks 202, 204 are a combination of computing hardware and installed software that may be utilized by a customer to create and/or add to a hyper-converged infrastructure. For example, the physical racks 202, 204 may include processing units (e.g., multiple blade servers), network switches to interconnect the processing units and to connect the physical racks 202, 204 with other computing units (e.g., other physical racks in a network environment such as a cloud computing environment), and/or data storage units (e.g., network attached storage, storage area network hardware, etc.). The example physical racks 202, 204 of FIG. 2 are prepared by the system integrator in a partially configured state to enable the computing devices to be rapidly deployed at a customer location (e.g., in less than 2 hours). For example, the system integrator may install operating systems, drivers, operations software, management software, etc. The installed components may be configured with some system details (e.g., system details to facilitate intercommunication between the components of the physical racks 202, 204) and/or may be prepared with software to collect further information from the customer when the hyper-converged infrastructure is installed and first powered on by the customer.

Initially in the illustrated example of FIG. 1, a system integrator partner selects a qualified hardware/software bill of materials (BoM) (block 108) for use in building the physical racks 202, 204. The system integrator partner then assembles the hardware for the physical racks 202, 204 (block 110). The system integrator partner uses a rack imaging appliance (RIA) to image the physical racks 202, 204 (block 112).

For example, to facilitate preparation of the physical rack 202 for distribution to a customer, the example system integrator uses the RIA (sometimes referred to as a "virtual imaging appliance") to prepare and configure the operating systems, system configurations, software, etc. on the physical racks 202, 204 prior to shipping the example physical racks 202, 204 to the customer. The RIA of the illustrated example is a virtual computing appliance provided to the system integrator by an example system solutions provider via a network. The RIA is executed by the system integrator in a hyper-converged infrastructure of the system integrator. For example, the RIA may be a virtual computing image, a virtual application, a container virtual machine image, a software application installed in an operating system of a computing unit of the system integrator, etc. The RIA may alternatively be provided by any other entity and/or may be a physical computing device, may be multiple physical computing devices, and/or may be any combination of virtual and physical computing components.

The RIA used in the illustrated example retrieves software images and configuration data from the virtual systems solutions provider via the network for installation on the physical racks 202, 204 during preparation of the physical racks 202, 204. The RIA used in the illustrated example pushes (e.g., transmits, sends, etc.) the software images and configuration data to the components of the physical racks 202, 204. For example, the RIA used in the illustrated example includes multiple network connections (e.g., virtual network connections, physical network connects, and/or any combination of virtual and network connections). For example, the RIA connects to a management interface of a network switch(es) installed in the physical racks 202, 204, installs network configuration information on the network switch(es), and reboots the switch(es) to load the installed configuration to communicatively couple the RIA with the computing unit(s) communicatively coupled via the network switch(es). The RIA also connects to a management network interface (e.g., an out of band (OOB) interface) of a server(s) installed in the example physical racks 202, 204 to cause an operating system(s) to be installed (e.g., utilizing a preboot execution environment (PXE) boot of an operating system installer). The RIA is also used to install hyper-converged infrastructure management components (described in further detail in conjunction with FIGS. 3-6 and in the following pages) and causes the hyper-converged infrastructure management components to boot so that they can take over the deployment of the example server racks 202, 204.

A virtual system solutions provider that provides the RIA to the system integrator partner is a business, such as VMware, Inc., that distributes (e.g., sells) the RIA. The virtual system solutions provider also provides a repository of images and/or other types of software (e.g., virtual machine images, drivers, operating systems, etc.) that may be retrieved by the RIA and installed on the physical racks 202, 204. The virtual system solutions provider may alternatively be implemented by multiple entities (e.g., from a manufacturer(s) of the software) and/or any other type of entity. Additional details of example RIA are disclosed in U.S. patent application Ser. No. 14/752,699, filed on Jun. 26, 2015, and titled "Methods and Apparatus for Rack Deployments for Virtual Computing Environments," which is hereby incorporated by reference herein in its entirety.

After imaging the physical racks 202, 204 at block 112, the system integrator ships and/or otherwise delivers the physical racks 202, 204 to the customer (block 114). Thus, the physical racks 202, 204 have been pre-configured to allow the customer to power on the example physical racks 202, 204 and quickly prepare the physical racks 202, 204 for installation in a new and/or existing computing system (e.g., a cloud computing system).

Turning now to the example process 104, the physical racks 202, 204 initially arrive at the customer site from the system integrator and the customer connects the physical racks 202, 204 to a network and powers the physical racks 202, 204 (block 116). For example, upon initially powering on the example physical racks 202, 204, the components of the example physical racks 202, 204 are already configured to communicate with each other and execute operating systems and software, which allows the example physical racks 202, 204 to provide an interface (e.g., a webpage interface) that, when accessed by the customer or an installer, gathers additional information for completing the configuration of the physical racks 202, 204. For example, the interface may gather and/or configure user credentials, network information, information about networked components (e.g., an address for a storage device such as a storage area network (SAN), an address for a management system (e.g., a VMware vCenter server(s)), etc.). The gathered information can be utilized by the components of the example physical racks 202, 204 to setup the physical racks 202, 204 as part of a new computing cluster and/or add the example physical racks 202, 204 to an existing computing cluster (e.g., a cloud computing system). For example, the customer may specify different domain types, security, capacity, availability, and performance requirements for establishing workload domains in the hyper-converged infrastructure 206 (FIG. 2) without requiring the customer to have in-depth knowledge of the hardware and configurations of the physical racks 202, 204.

After the customer powers on the physical racks 202, 204 at block 116, hardware management systems (HMSs) 208, 214 (FIG. 2) of the physical racks 202, 204 auto discover hardware resources in the physical racks 202, 204, boot hosts and switches in the physical racks 202, 204, install stacks in the physical racks 202, 204, and make the physical racks 202, 204 inventory ready (block 118). For example, the physical racks 202, 204 are inventory ready for SDDC managers 225, 227 of FIG. 2 to collect and manage hardware resource inventories of the physical racks 202, 204. The HMSs 208, 214 are described below in connection with FIGS. 2-6. Additional details of the HMSs 208, 214 are also disclosed in U.S. patent application Ser. No. 14/788,004, filed on Jun. 30, 2015, and titled "Methods and Apparatus to Configure Hardware Management Systems for use in Virtual Server Rack Deployments for Virtual Computing Environments," which is hereby incorporated by reference herein in its entirety.

The SDDC managers 225, 227 (e.g., an EVO manager) are initialized and allocate resources, starts a cloud infrastructure service (e.g., a VMware vCenter server), and creates management clusters (block 120). The SDDC managers 225, 227 are described below in connection with FIGS. 2-6. Additional details of the SDDC managers 225, 227 are also disclosed in U.S. patent application Ser. No. 14/796,803, filed on Jul. 10, 2015, and titled "Methods and Apparatus to Configure Virtual Resource Managers for use in Virtual Server Rack Deployments for Virtual Computing Environments." which is hereby incorporated by reference herein in its entirety.

A software defined data center (SDDC) is then ready to run in the hyper-converged infrastructure 206 on the physical racks 202, 204 (block 122).

FIG. 2 depicts the example physical racks 202, 204 in an example deployment of the hyper-converged infrastructure 206. In the illustrated example, the first physical rack 202 has an example top-of-rack (ToR) switch A 210, an example ToR switch B 212, an example management switch 207, and an example server host node (0) 209. In the illustrated example, the management switch 207 and the server host node (0) 209 run a hardware management system (HMS) 208 for the first physical rack 202. The second physical rack 204 of the illustrated example is also provided with an example ToR switch A 216, an example ToR switch B 218, an example management switch 213, and an example server host node (0) 211. In the illustrated example, the management switch 213 and the server host node (0) 211 run an HMS 214 for the second physical rack 204.

In the illustrated example, the management switches 207, 213 of the corresponding physical racks 202, 204 run corresponding out-of-band (OOB) agents (e.g., an example OOB agent 612 described below in connection with FIG. 6) and OOB plugins (e.g., an example OOB plugin 621 described below in connection with FIG. 6) of the corresponding HMSs 208, 214. Also in the illustrated example, the server host nodes (0) 209, 211 of the corresponding physical racks 202, 204 run corresponding IB agents (e.g., an example IB agent 613 described below in connection with FIG. 6), IB plugins (e.g., an example IB plugin 623 described below in connection with FIG. 6), HMS service APIs (e.g., an example generic HMS service API 610 described below in connection with FIG. 6), and aggregators (e.g., an example HMS aggregator 611 described below in connection with FIG. 6).

In the illustrated example, the HMS 208, 214 connects to server management ports of the server host node (0) 209, 211 (e.g., using a baseboard management controller (BMC)), connects to ToR switch management ports (e.g., using 1 Gbps links) of the ToR switches 210, 212, 216, 218, and also connects to spine switch management ports of one or more spine switches 222. These example connections form a non-routable private Internet protocol (IP) management network for OOB management. The HMS 208, 214 of the illustrated example uses this OOB management interface to the server management ports of the server host node (0) 209, 211 for server hardware management. In addition, the HMS 208, 214 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server network interface card (NIC) ports (e.g., using 10 Gbps links) of server hosts in the physical racks 202, 204 for downlink communications and to the spine switch(es) (e.g., using 40 Gbps links) for uplink communications. In the illustrated example, the management switch 207, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 208, 214 is provided with IB connectivity to individual server nodes (e.g., server nodes in example physical hardware resources 224, 226) of the physical rack 202, 204. In the illustrated example, the IB connection interfaces to physical hardware resources 224, 226 via an operating system running on the server nodes using an OS-specific API such as vSphere API, command line interface (CLI), and/or interfaces such as Common Information Model from Distributed Management Task Force (DMTF).

The HMSs 208, 214 of the corresponding physical racks 202, 204 interface with SDDC managers 225, 227 of the corresponding physical racks 202, 204 to instantiate and manage the hyper-converged infrastructure 206 using physical hardware resources 224, 226 (e.g., processors, network interface cards, servers, switches, storage devices, peripherals, power supplies, etc.) of the physical racks 202, 204. In the illustrated example, the SDDC manager 225 of the first physical rack 202 runs on a cluster of three server host nodes of the first physical rack 202, one of which is the server host node (0) 209. As used herein, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. Also in the illustrated example, the SDDC manager 227 of the second physical rack 204 runs on a cluster of three server host nodes of the second physical rack 204, one of which is the server host node (0) 211. In the illustrated example, the SDDC managers 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the hyper-converged infrastructure 206.

The SDDC manager 225 runs on a cluster of three server host nodes of the first physical rack 202 using a high availability (HA) mode configuration. In addition, the SDDC manager 227 runs on a cluster of three server host nodes of the second physical rack 204 using the HA mode configuration. Using the HA mode in this manner, enables fault tolerant operation of the SDDC manager 225, 227 in the event that one of the three server host nodes in the cluster for the SDDC manager 225, 227 fails. Upon failure of a server host node executing the SDDC manager 225, 227, the SDDC manager 225, 227 can be restarted to execute on another one of the hosts in the cluster. Therefore, the SDDC manager 225, 227 continues to be available even in the event of a failure of one of the server host nodes in the cluster.

In examples disclosed herein, a command line interface (CLI) and APIs are used to manage the ToR switches 210, 212, 216, 218. For example, the HMS 208, 214 uses CLI/APIs to populate switch objects corresponding to the ToR switches 210, 212, 216, 218. On HMS bootup, the HMS 208, 214 populates initial switch objects with statically available information. In addition, the HMS 208, 214 uses a periodic polling mechanism as part of an HMS switch management application thread to collect statistical and health data from the TOR switches 210, 212, 216, 218 (e.g., Link states, Packet Stats, Availability, etc.). There is also a configuration buffer as part of the switch object which stores the configuration information to be applied on the switch.

Figure 3:
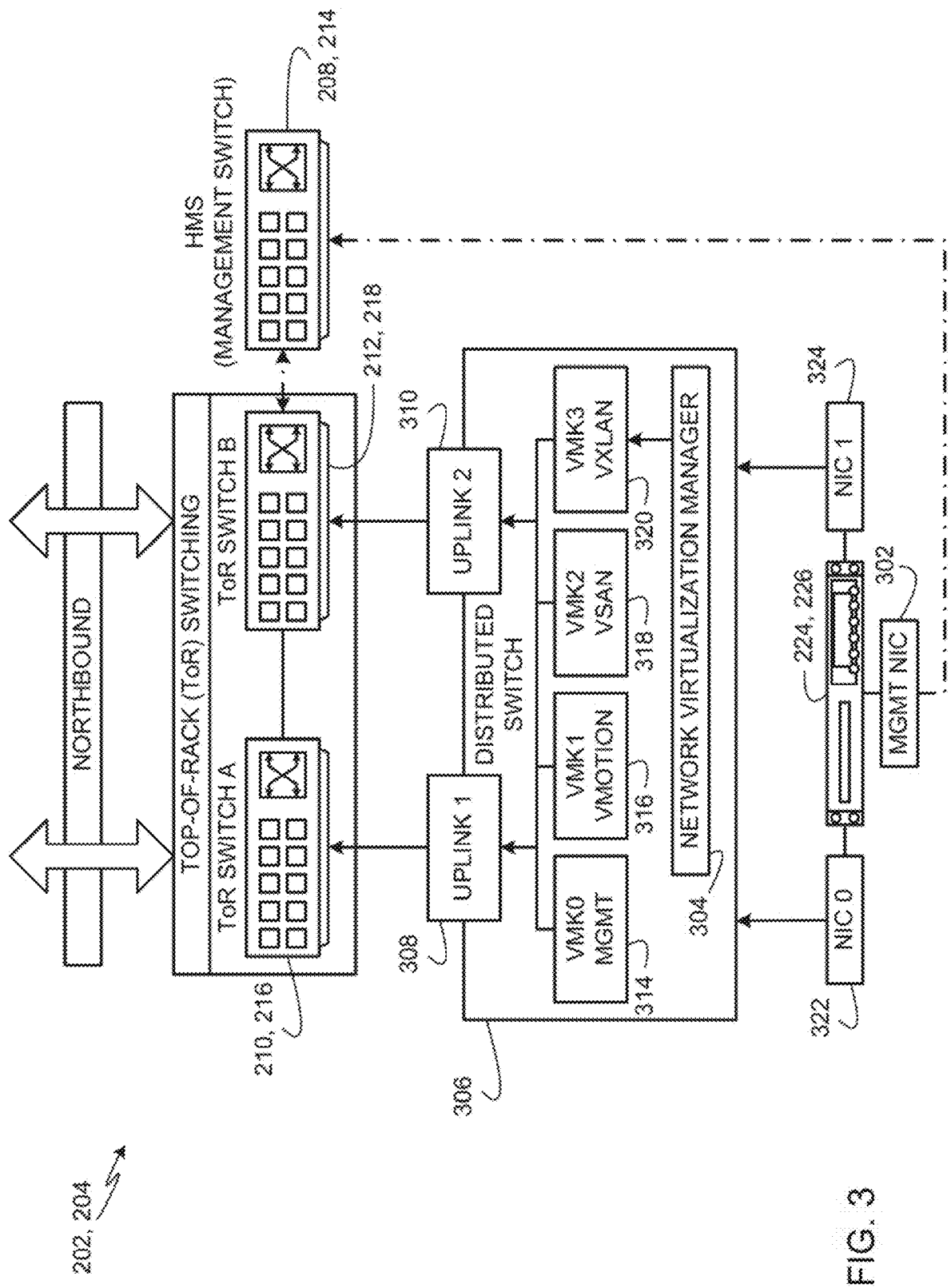
FIG. 3 depicts an example configuration of one of the example physical racks of FIG. 2.

FIG. 3 depicts an example configuration of one of the example physical racks 202, 204 of FIG. 2. In the illustrated example of FIG. 3, the HMS 208, 214 is in communication with a physical hardware resource 224, 226 through a management network interface card (NIC) 302. The example HMS 208, 214 is also shown in communication with the example ToR switches 210, 216, 212, 218. The example ToR switches 210, 216, 212, 218 are in communication with a distributed switch 306 through multiple uplink ports 308, 310 of the distributed switch 306. In the illustrated example, the uplink ports 308, 310 are implemented using separate network interface cards (NICs).

In the illustrated example, the distributed switch 306 runs numerous virtual adapters known as virtual machine kernels (VMKs) including an example VMK0 management kernel 314, an example VMK1 vMotion kernel 316, an example VMK2 vSAN kernel 318, and an example VMK3 VXLAN 320. The VMK0 management kernel 314 virtual adapter is software executed by the distributed switch 306 to manage use of ones of or portions of the physical hardware resources 224, 226 allocated for use by the distributed switch 306. In examples disclosed herein, the SDDC manager (1) 225 of FIG. 2 uses the VMK0 management kernel 314 to communicate with the SDDC manager (s) 227 through the spine switches 222 of FIG. 2. The VMK1 vMotion 316 virtual adapter is software executed by the distributed switch 306 to facilitate live migration of virtual machines between physical hardware resources 224, 226 with substantially little or no downtime to provide continuous service availability from the virtual machines being migrated. The VMK2 vSAN 318 virtual adapter is software executed by the distributed switch 306 to aggregate locally attached data storage disks in a virtual cluster to create a storage solution that can be provisioned from the distributed switch 306 during virtual machine provisioning operations. The example VMK3 VXLAN 320 is virtual adapter software executed by the distributed switch to establish and/or support one or more virtual networks provisioned in the distributed switch 306. In the illustrated example, the VMK3 VXLAN 320 is in communication with an example network virtualization manager 304. The network virtualization manager 304 of the illustrated example manages virtualized network resources such as physical hardware switches to provide software-based virtual networks. The example network virtualization manager 304 may be implemented using, for example, the VMware NSX® network virtualization manager 416 of FIG. 4. In the illustrated example of FIG. 3, the distributed switch 306 is shown interfacing with one or more of the physical hardware resources 224, 226 through multiple NICs 322, 324. In this manner, the VM kernels 314, 316, 318, 320 can instantiate virtual resources based on one or more, or portions of, the physical hardware resources 224, 226.

The HMS 208, 214 of the illustrated examples of FIGS. 2 and 3, is a stateless software agent responsible for managing individual hardware elements in a physical rack 202, 204. Examples of hardware elements that the HMS 208, 214 manages are servers and network switches in the physical rack 202, 204. In the illustrated example, the HMS 208, 214 is implemented using Java on Linux so that an OOB portion (e.g., the OOB agent 612 of FIG. 6) of the HMS 208, 214 run as a Java application on a white box management switch (e.g., the management switch 207, 213) in the physical rack 202, 204. However, any other programming language and any other operating system may be used to implement the HMS 208, 214. The physical hardware resources 224, 226 that the HMS 208, 214 manages include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, the HMS 208, 214 may also be used to manage non-white label equipment such as original equipment manufacturer (OEM) equipment. Such OEM equipment includes OEM Servers such as Hewlett-Packard® (HP) servers and Lenovo) servers, and OEM Switches such as Arista switches, and/or any other OEM server, switches, or equipment.

Figure 4:
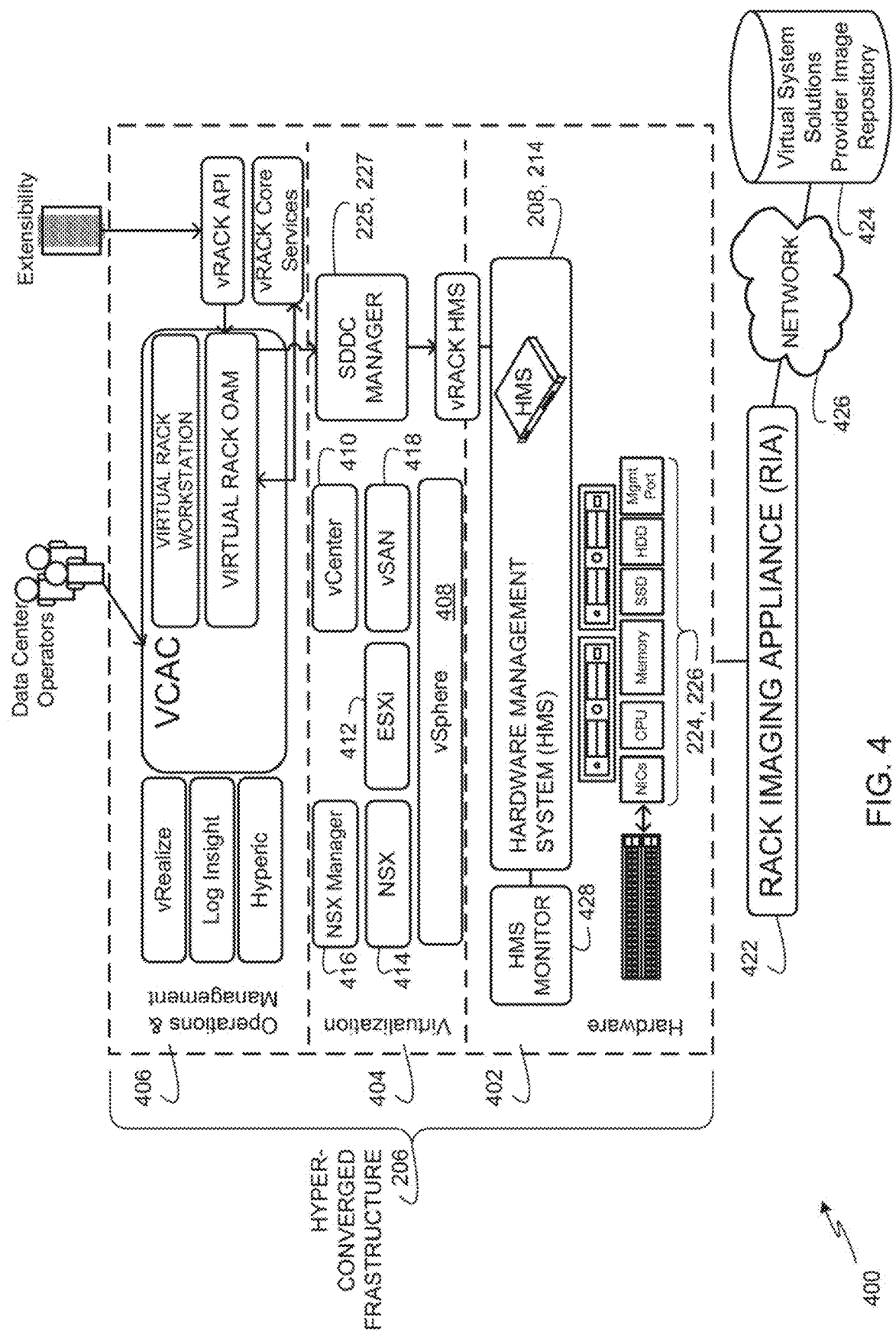
FIG. 4 depicts an example architecture to configure and deploy the example hyper-converged infrastructure of FIG. 2.

FIG. 4 depicts an example architecture 400 in which an example rack imaging appliance 422 (e.g., the example RIA described in connection with FIG. 1) is utilized to configure and deploy the hyper-converged infrastructure 206 (e.g., one or more of the example physical racks 202, 204 of FIG. 2).

The example architecture 400 of FIG. 4 includes a hardware layer 402, a virtualization layer 404, and an operations and management component 406. In the illustrated example, the hardware layer 402, the virtualization layer 404, and the operations and management component 406 are part of the example hyper-converged infrastructure 206 of FIG. 2. The hyper-converged infrastructure 206 of the illustrated example is based on the physical racks 202, 204 of FIG. 2. Alternatively, either one of the physical racks 202, 204 may be operated in a stand-alone manner to instantiate and run the hyper-converged infrastructure 206. The example hyper-converged infrastructure 206 is configured to configure the physical hardware resources 224, 226, to virtualize the physical hardware resources 224, 226 into virtual resources, to provision virtual resources for use in providing cloud-based services, and to maintain the physical hardware resources 224, 226 and the virtual resources. The example architecture 400 includes a rack imaging appliance (RIA) 422 that communicates with the hardware layer 402 to store operating system (OS) and software images in memory of the hardware layer 402 for use in initializing physical resources needed to configure the hyper-converged infrastructure 206. In the illustrated example, the RIA 422 retrieves the OS and software images from a virtual system solutions provider image repository 424 via an example network 426 (e.g., the Internet). For example, the RIA 422 may be the RIA provided to a system integrator as described in connection with FIG. 1 by a virtual system solutions provider to configure new physical racks (e.g., the physical racks 202, 204 of FIGS. 2 and 3) for use as hyper-converged infrastructures (e.g., the hyper-converged infrastructure 206). That is, whenever the system integrator wishes to configure new hardware (e.g., a new physical rack) for use as a hyper-converged infrastructure, the system integrator connects the RIA 422 to the new hardware, and the RIA 422 communicates with the virtual system provider image repository 424 to retrieve OS and/or software images needed to configure the new hardware for use as a hyper-converged infrastructure. In the illustrated example, the OS and/or software images located in the virtual system provider image repository 424 are configured to provide the system integrator with flexibility in selecting to obtain hardware from any of a number of hardware manufacturers. As such, end users can source hardware from multiple hardware manufacturers without needing to develop custom software solutions for each hardware manufacturer. Further details of the example RIA 422 are disclosed in U.S. patent application Ser. No. 14/752,699, filed on Jun. 26, 2015, and titled "Methods and Apparatus for Rack Deployments for Virtual Computing Environments," which is hereby incorporated herein by reference in its entirety.

The example hardware layer 402 of FIG. 4 includes the HMS 208, 214 of FIGS. 2 and 3 that interfaces with the physical hardware resources 224, 226 (e.g., processors, network interface cards, servers, switches, storage devices, peripherals, power supplies, etc.). The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the hyper-converged infrastructure 206 in a hardware-independent manner. The HMS 208, 214 also supports rack-level boot-up sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 202, 204 including the dual-redundant management switches 207, 213 and dedicated management ports attached to the server host nodes (0) 209, 211 and the ToR switches 210, 212, 216, 218 (FIGS. 2 and 3). In the illustrated example, one instance of the HMS 208, 214 runs per physical rack 202, 204. For example, the HMS 208, 214 may run on the management switch 207, 213 and the server host node (0) 209, 211 installed in the example physical racks 202, 204 of FIG. 2. In the illustrated example of FIG. 2 both of the HMSs 208, 214 are provided in corresponding management switches 207, 213 and the corresponding server host nodes (0) 209, 211 as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch 207, 213 and/or a failure of the server host nodes (0) 209, 211 on which the other HMS 208, 214 executes. In some examples, to achieve seamless failover, two instances of an HMS 208, 214 run in a single physical rack 202, 204. In such examples, the physical rack 202, 204 is provided with two management switches, and each of the two management switches runs a separate instance of the HMS 208, 214. In such examples, the physical rack 202 of FIG. 2 runs two instances of the HMS 208 on two separate physical hardware management switches and two separate server host nodes (0), and the physical rack 204 of FIG. 2 runs two instances of the HMS 214 on two separate physical hardware management switches and two separate server host nodes (0). In this manner, for example, one of the instances of the HMS 208 on the physical rack 202 serves as the primary HMS 208 and the other instance of the HMS 208 serves as the secondary HMS 208. The two instances of the HMS 208 on two separate management switches and two separate server host nodes (0) in the physical rack 202 (or the two instances of the HMS 214 on two separate management switches and two separate server host nodes (0) in the physical rack 204) are connected over a point-to-point, dedicated Ethernet link that carries heartbeats and memory state synchronization between the primary and secondary HMS instances.

There are numerous categories of failures that the HMS 208, 214 can encounter. Some example failure categories are shown below in Table 1.

TABLE 1

HMS Failure Categories

| Failure Type | Examples | Impact | Remediation |
|---|---|---|---|
| 1. HMS Agent Software Failures | Unable to allocate new resources Memory corruption Software Crash CPU hogging Memory leaks | Short term loss of HMS function [Minutes] | Restart from Monitor |
| 2. HMS Agent Unrecoverable Software Failure | Unable to start demon Unable to resolve Failure Type1 Consistent software crash | Longer term loss of HMS function [Hours] | Maintenance mode thin HMS Agent till issue resolved |
| 3. Management Switch Operating System Software Failures | Processes Failures Kernel Failures Unable to boot switch OS ONIE/bootloader | Short to Long Term Loss of Mgmt Switch and HMS function | Process restart for user processes. Reboots tor Kernel failures Manual intervention |

TABLE 1-continued

HMS Failure Categories

| Failure Type | Examples | Impact | Remediation |
| --- | --- | --- | --- |
| 4. Management Switch Hardware Failures | issues Link down on management ports to Server Link Down on management ports to ToR nodes Link down from SDDC Manager Host to HMS on Mgmt Switch Critical Hardware alarms | Portions of rack unavailable SDDC manager-HMS communication loss | for failed boots Reset Links from PRM Notify SDDC manager for manual intervention |
| 5. Management Switch Un- Recoverable Hardware Failure | Management switch fails to boot Erratic Resets of hardware while running | Long term loss of HMS/Mgmt Switch | Manual intervention or standby switch |

In the illustrated example of FIG. 4, the hardware layer 402 includes an example HMS monitor 428 to monitor the operational status and health of the HMS 208, 214. The example HMS monitor 428 is an external entity outside of the context of the HMS 208, 214 that detects and remediates failures in the HMS 208, 214. That is, the HMS monitor 428 is a process that runs outside the HMS daemon to monitor the daemon. For example, the HMS monitor 428 can run alongside the HMS 208, 214 in the same management switch 207, 213 as the HMS 208, 214. The example HMS monitor 428 is configured to monitor for Type 1 failures of Table 1 above and restart the HMS daemon when required to remediate such failures. The example HMS monitor 428 is also configured to invoke a HMS maintenance mode daemon to monitor for Type 2 failures of Table 1 above. In examples disclosed herein, an HMS maintenance mode daemon is a minimal HMS agent that functions as a basic backup of the HMS 208, 214 until the Type 2 failure of the HMS 208, 214 is resolved.

The example virtualization layer 404 includes the SDDC manager 225, 227. The example SDDC manager 225, 227 communicates with the HMS 208, 214 to manage the physical hardware resources 224, 226. The example SDDC manager 225, 227 creates the example hyper-converged infrastructure 206 out of underlying physical hardware resources 224, 226 that may span one or more physical racks (or smaller units such as a hyper-appliance or half rack) and handles physical management of those resources. The example SDDC manager 225, 227 uses the hyper-converged infrastructure 206 as a basis of aggregation to create and provide operational views, handle fault domains, and scale to accommodate workload profiles. The example SDDC manager 225, 227 keeps track of available capacity in the hyper-converged infrastructure 206, maintains a view of a logical pool of virtual resources throughout the SDDC life-cycle, and translates logical resource provisioning to allocation of physical hardware resources 224, 226. The example SDDC manager 225, 227 interfaces with components of the virtual system solutions provider described in connection with FIG. 1 such as an example VMware vSphere® virtualization infrastructure components suite 408, an example VMware vCenter® virtual infrastructure server 410, an example ESXi™ hypervisor component 412, an example VMware NSX® network virtualization platform 414 (e.g., a network virtualization component or a network virtualizer), an example VMware NSX® network virtualization manager 416, and an example VMware vSAN™ network data storage virtualization component 418 (e.g., a network data storage virtualizer). In the illustrated example, the SDDC manager 225, 227 communicates with these components to manage and present the logical view of underlying resources such as hosts and clusters. The example SDDC manager 225, 227 also uses the logical view for orchestration and provisioning of workloads. Additional details of the SDDC manager 225, 227 are disclosed below in connection with FIG. 5.

The VMware vSphere® virtualization infrastructure components suite 408 of the illustrated example is a collection of components to setup and manage a virtual infrastructure of servers, networks, and other resources. Example components of the VMware vSphere® virtualization infrastructure components suite 408 include the example VMware vCenter® virtual infrastructure server 410 and the example ESXi™ hypervisor component 412.

The example VMware vCenter® virtual infrastructure server 410 provides centralized management of a virtualization infrastructure (e.g., a VMware vSphere® virtualization infrastructure). For example, the VMware vCenter® virtual infrastructure server 410 provides centralized management of virtualized hosts and virtual machines from a single console to provide IT administrators with access to inspect and manage configurations of components of the virtual infrastructure.

The example ESXi™ hypervisor component 412 is a hypervisor that is installed and runs on servers (e.g., the example physical servers 616 of FIG. 6) in the example physical resources 224, 226 to enable the servers to be partitioned into multiple logical servers to create virtual machines.

The example VMware NSX® network virtualization platform 414 (e.g., a network virtualization component or a network virtualizer) virtualizes network resources such as physical hardware switches (e.g., the physical switches 618 of FIG. 6) to provide software-based virtual networks. The example VMware NSX® network virtualization platform 414 enables treating physical network resources (e.g., switches) as a pool of transport capacity. In some examples, the VMware NSX® network virtualization platform 414 also provides network and security services to virtual machines with a policy driven approach.

The example VMware NSX® network virtualization manager 416 manages virtualized network resources such as physical hardware switches (e.g., the physical switches 618 of FIG. 6) to provide software-based virtual networks. In the illustrated example, the VMware NSX® network virtualization manager 416 is a centralized management component of the VMware NSX® network virtualization platform 414 and runs as a virtual appliance on an ESXi host (e.g., one of the physical servers 616 of FIG. 6 running an ESXi™ hypervisor 412). In the illustrated example, a VMware NSX® network virtualization manager 416 manages a single vCenter server environment implemented using the VMware vCenter® virtual infrastructure server 410. In the illustrated example, the VMware NSX® network virtualization manager 416 is in communication with the VMware vCenter® virtual infrastructure server 410, the ESXi™ hypervisor component 412, and the VMware NSX® network virtualization platform 414.

The example VMware vSAN™ network data storage virtualization component 418 is software-defined storage for use in connection with virtualized environments implemented using the VMware vSphere® virtualization infrastructure components suite 408. The example VMware vSAN™ network data storage virtualization component clusters server-attached hard disk drives (HDDs) and solid state drives (SSDs) to create a shared datastore for use as virtual storage resources in hyper-converged infrastructures and/or virtual environments.

Although the example VMware vSphere® virtualization infrastructure components suite 408, the example VMware vCenter® virtual infrastructure server 410, the example ESXi™ hypervisor component 412, the example VMware NSX® network virtualization platform 414, the example VMware NSX® network virtualization manager 416, and the example VMware vSAN™ network data storage virtualization component 418 are shown in the illustrated example as implemented using products developed and sold by VMware, Inc., some or all of such components may alternatively be supplied by components with the same or similar features developed and sold by other virtualization component developers.

The virtualization layer 404 of the illustrated example, and its associated components are configured to run virtual machines. However, in other examples, the virtualization layer 404 may additionally or alternatively be configured to run containers. A virtual machine is a data computer node that operates with its own guest operating system on a host using resources of the host virtualized by virtualization software. A container is a data computer node that runs on top of a host operating system without the need for a hypervisor or separate operating system.

The hyper-converged infrastructure 206 of the illustrated example enables abstracting the physical hardware resources 224, 226. In some examples, the hyper-converged infrastructure 206 includes a set of physical units (e.g., one or more racks) with each unit including hardware 224, 226 such as server nodes (e.g., compute+storage+network links), network switches, and, optionally, separate storage units. From a user perspective, the example hyper-converged infrastructure 206 is an aggregated pool of logic resources exposed as one or more vCenter ESXi™ clusters along with a logical storage pool and network connectivity. In examples disclosed herein, a cluster is a server group in a virtual environment. For example, a vCenter ESXi™ cluster is a group of physical servers (e.g., example physical servers 616 of FIG. 6) in the physical hardware resources 224, 226 that run ESXi™ hypervisors (developed and sold by VMware, Inc.) to virtualize processor, memory, storage, and networking resources into logical resources to run multiple virtual machines that run operating systems and applications as if those operating systems and applications were running on physical hardware without an intermediate virtualization layer.

In the illustrated example, the example OAM component 406 is an extension of a VMware vCloud® Automation Center (VCAC) that relies on the VCAC functionality and also leverages utilities such as vRealize, Log Insight™, and Hyperic® to deliver a single point of SDDC operations and management. The example OAM component 406 is configured to provide different services such as heat-map service, capacity planner service, maintenance planner service, events and operational view service, and virtual rack application workloads manager service.

In the illustrated example, a heat map service of the OAM component 406 exposes component health for hardware mapped to virtualization and application layers (e.g., to indicate good, warning, and critical statuses). The example heat map service also weighs real-time sensor data against offered service level agreements (SLAs) and may trigger some logical operations to make adjustments to ensure continued SLA.

In the illustrated example, the capacity planner service of the OAM component 406 checks against available resources and looks for potential bottlenecks before deployment of an application workload. Example capacity planner service also integrates additional rack units in the collection/stack when capacity is expanded.

In the illustrated example, the maintenance planner service of the OAM component 406 dynamically triggers a set of logical operations to relocate virtual machines (VMs) before starting maintenance on a hardware component to increase the likelihood of substantially little or no downtime. The example maintenance planner service of the OAM component 406 creates a snapshot of the existing state before starting maintenance on an application. The example maintenance planner service of the OAM component 406 automates software upgrade/maintenance by creating a clone of the machines and proceeds to upgrade software on clones, pause running machines, and attaching clones to a network. The example maintenance planner service of the OAM component 406 also performs rollbacks if upgrades are not successful.

In the illustrated example, an events and operational views service of the OAM component 406 provides a single dashboard for logs by feeding to Log Insight. The example events and operational views service of the OAM component 406 also correlates events from the heat map service against logs (e.g., a server starts to overheat, connections start to drop, lots of HTTP/503 from App servers). The example events and operational views service of the OAM component 406 also creates a business operations view (e.g., a top down view from Application Workloads⇒Logical Resource View⇒Physical Resource View). The example events and operational views service of the OAM component 406 also provides a logical operations view (e.g., a bottom up view from Physical resource view⇒vCenter ESXi Cluster View⇒VM's view).

In the illustrated example, the virtual rack application workloads manager service of the OAM component 406 uses vCAC and vCAC enterprise services to deploy applications to vSphere hosts. The example virtual rack application workloads manager service of the OAM component 406 uses data from the heat map service, the capacity planner service, the maintenance planner service, and the events and operational views service to build intelligence to pick the best mix of applications on a host (e.g., not put all high CPU intensive apps on one host). The example virtual rack application workloads manager service of the OAM component 406 optimizes applications and virtual storage area network (vSAN) arrays to have high data resiliency and best possible performance at same time.

Figure 5:
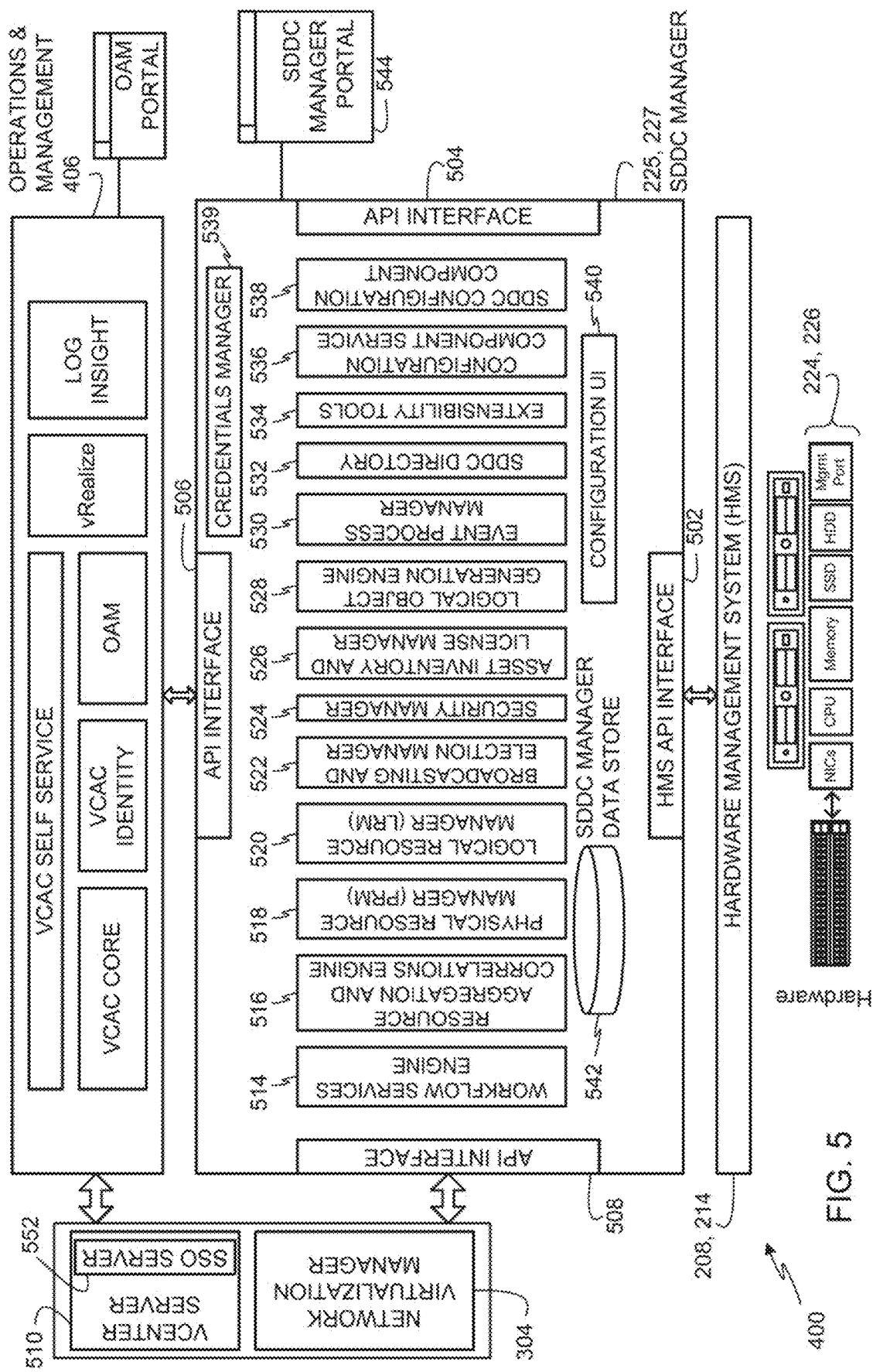
FIG. 5 depicts the example hardware management system (HMS) of FIGS. 2-4 interfacing between the example hardware and an example software defined data center (SDDC) manager of FIGS. 2 and 4.

FIG. 5 depicts another view of the example architecture 400 of FIG. 4 showing the example HMS 208, 214 of FIGS. 2-4 interfacing between the example physical hardware resources 224, 226 of FIGS. 2-4 and the example SDDC manager 225, 227 of the example architecture 400 of FIG. 4. In the illustrated example, the SDDC manager 225, 227 includes numerous application program interfaces (APIs) 502, 504, 506, 508 to interface with other components of the architecture 400. The APIs 502, 504, 506, 508 of the illustrated example include routines, protocols, function calls, and other components defined for use by external programs, routines, or components to communicate with the SDDC manager 225, 227. Such communications may include sending information to the SDDC manager 225, 227, requesting information from the SDDC manager 225, 227, requesting the SDDC manager 225, 227 to perform operations, configuring the SDDC manager 225, 227, etc. For example, an HMS API interface 502 of the SDDC manager 225, 227 is to facilitate communications between the HMS 208, 214 and the SDDC manager 225, 227, another API interface 506 of the SDDC manager 225, 227 is to facilitate communications between the operations and management component 406 and the SDDC manager 225, 227, and another API interface 508 of the SDDC manager 225, 227 is to facilitate communications between the SDDC manager 225, 227 and the network virtualization manager 304 and a vCenter server 510. Another API interface 504 of the SDDC manager 225, 227 may be used to facilitate communications between the SDDC manager 225, 227 and user interfaces for use by administrators to manage the SDDC manager 225, 227.

The example SDDC manager 225, 227 communicates with the HMS 208, 214 via the HMS API interface 502 to manage the physical hardware resources 224, 226. For example, the SDDC manager 225, 227 obtains and maintains inventory of the physical hardware resources 224, 226 through communications with the HMS 208, 214. The example SDDC manager 225, 227 also uses the HMS 208, 214 to discover new hardware (e.g., the physical hardware resources 224, 226) and adds newly discovered hardware to inventory. The example SDDC manager 225, 227 is also configured to manage the physical hardware resources 224, 226 within the hyper-converged infrastructure 206 by using the per-rack HMS 208, 214. The example SDDC manager 225, 227 maintains the notion of fault domains and uses those domains in its mapping of logical resources (e.g., virtual resources) to the physical hardware resources 224, 226. In response to notification of hardware events from the HMS 208, 214, the example SDDC manager 225, 227 handles addition/removal of physical hardware resources 224, 226 (e.g., servers or switches at a physical rack level), addition of new rack units, maintenance, and hard shutdowns/resets. The example SDDC manager 225, 227 also translates physical sensor data and alarms to logical events.

In the illustrated example of FIG. 5, a software stack of the SDDC manager 225, 227 includes an example workflow services engine 514, an example resource aggregation and correlations engine 516, an example physical resource manager (PRIM) 518, an example logical resource manager (LRM) 520, an example broadcasting and election manager 522, an example security manager 524, an example asset inventory and license manager 526, an example logical object generation engine 528, an example event process manager 530, an example SDDC manager directory 532, example extensibility tools 534, an example configuration component service 536, an example SDDC manager configuration component 538, an example credential manager 539 and an example configuration user interface (UI) 540. The example SDDC manager 225, 227 also includes an example SDDC manager data store 542. The example workflow services engine 514 is provided to manage the workflows of services provisioned to be performed by resources of the hyper-converged infrastructure 206. The example resource aggregation and correlations engine 516 is provided to aggregate logical and physical resources and to coordinate operations between the logical and physical resources for allocating to services to be performed by the hyper-converged infrastructure 206. The example PRM 518 is provided to provision, maintain, allocate, and manage the physical hardware resources 224, 226 for use by the hyper-converged infrastructure 206 for provisioning and allocating logical resources. The example LRM 520 is provided to provision, maintain, allocate, and manage logical resources.

The example broadcasting and election manager 522 is provided to broadcast or advertise capabilities of the hyper-converged infrastructure 206. For example, services seeking resources of hyper-converged infrastructure s may obtain capabilities (e.g., logical resources) that are available from the hyper-converged infrastructure 206 by receiving broadcasts or advertisements of such capabilities from the broadcasting and election manager 522. The broadcasting and election manager 522 is also configured to identify resources of the hyper-converged infrastructure 206 that have been requested for allocation. The example security manager 524 is provided to implement security processes to protect from misuse of resources of the hyper-converged infrastructure 206 and/or to protect from unauthorized accesses to the hyper-converged infrastructure 206.

In the illustrated example, the broadcasting and election manager 522 is also provided to manage an example primary SDDC manager selection process. In examples disclosed herein, a primary SDDC manager selection process is performed by the SDDC manager 225, 227 to determine a SDDC manager that is to operate as the primary SDDC manager for a hyper-converged infrastructure. For example, as shown in FIG. 2, the example hyper-converged infrastructure 206 includes the first SDDC manager 225 that runs in the first physical rack 202, and the second SDDC manager 227 that runs in the second physical rack 204. In the illustrated example of FIG. 2, the first SDDC manager 225 and the second SDDC manager 227 communicate with each other to perform the primary SDDC manager selection process. For example, the SDDC manager 225 may perform a process to obtain information from the second SDDC manager 227 and execute an algorithm to decide whether it (the first SDDC manager 225) or the second SDDC manager 227 are to be the primary SDDC manager to manage virtual resources of all the physical racks 202, 204 of the hyper-converged infrastructure 206. In some examples, the broadcasting and election manager 522 instantiates a zookeeper of the corresponding SDDC manager 225, 227. In some examples, the broadcasting and election manager 522 performs the primary SDDC manager selection process as part of the zookeeper. For example, the broadcasting and election manager 522 may perform the primary SDDC manager selection and process and select the SDDC manager 225 to be the primary SDDC manager. The example broadcasting and election manager 522 may then instantiate the zookeeper of the primary SDDC manager 225.

The example asset inventory and license manager 526 is provided to manage inventory of components of the hyper-converged infrastructure 206 and to ensure that the different components of the hyper-converged infrastructure 206 are used in compliance with licensing requirements. In the illustrated example, the example asset inventory and license manager 526 also communicates with licensing servers to ensure that the hyper-converged infrastructure 206 has up-to-date licenses in place for components of the hyper-converged infrastructure 206. The example logical object generation engine 528 is provided to generate logical objects for different portions of the physical hardware resources 224, 226 so that the logical objects can be used to provision logical resources based on the physical hardware resources 224, 226. The example event process manager 530 is provided to manage instances of different processes running in the hyper-converged infrastructure 206. The example SDDC directory 532 is provided to track identities and availabilities of logical and physical resources in the hyper-converged infrastructure 206. The example extensibility tools 534 are provided to facilitate extending capabilities of the hyper-converged infrastructure 206 by adding additional components such as additional physical racks to form the hyper-converged infrastructure 206.

The example configuration component service 536 finds configuration components for virtualizing the physical rack 202, 204 and obtains configuration parameters that such configuration components need for the virtualization process. The example configuration component service 536 calls the configuration components with their corresponding configuration parameters and events. The example configuration component service 536 maps the configuration parameters to user interface properties of the example configuration UI 540 for use by administrators to manage the SDDC manager 225, 227 through an example SDDC manager portal 544. The example SDDC manager portal 544 is a web-based interface that provides access to one or more of the components of the SDDC manager 225, 227 to enable an administrator to configure the SDDC manager 225, 227.

The example SDDC configuration component 538 implements configurator components that include configuration logic for configuring virtualization components of the example virtualization layer 404 of FIG. 4.

In the illustrated example, the illustrated example, the SDDC manager 225, 227 are provided an example credentials manager 539 to automate managing credentials for resources in the hyper-converged infrastructure 206. The example credentials manager 539 rotates (e.g., updates) credentials used by the resources for authentication when communicating with the SDDC manager 225, 227. For example, the SDDC manager 225, 227 may communicate with, for example, the backend components 410, 412, 414, 416, 418 of FIG. 4 using a secure shell (SSH) communication interface. In some such examples, during setup by the system integrator, the example RIA may store default credentials in a known hosts file in the credentials manager 539. In the illustrated example, the known hosts file includes public keys associated with components that the respective SDDC manager 225, 227 is able to access. The default credentials may be public keys of public-private key pairs (also known as "host keys") used by the SDDC manager 225, 227 to authenticate the components of the hyper-converged infrastructure 206. When the SDDC manager 225, 227 is initialized, the example credentials manager 539 causes the components to generate new keys and then retrieves the public key from the respective component. The example credentials manager 539 then stores an encrypted version of the public key in a shared keys database and stores a decrypted (e.g., unencrypted) version of the public key in the example known hosts file. The example credentials manager 539 also facilitates synchronizing the public keys stored in the known hosts file after startup process is complete. An example implementation of the credentials manager 539 of FIG. 5 is disclosed in connection with FIG. 7.

The example SDDC manager data store 542 is provided to store configuration information, provisioning information, resource allocation information, and/or any other information used by the SDDC manager 225, 227 to manage hardware configurations, logical configurations, workflows, services, etc. of the hyper-converged infrastructure 206.

Upon startup of the SDDC manager 225, 227 of the illustrated example, the SDDC manager 225, 227 is reconfigured with new network settings. To reconfigure the new network settings across backend components (e.g., the VMware vCenter® virtual infrastructure server 410, the ESXi™ hypervisor component 412, the VMware NSX® network virtualization platform 414, the VMware NSX® network virtualization manager 416, and the VMware vSAN™ network data storage virtualization component 418 of FIG. 4), the SDDC manager 225, 227 serves the example configuration UI 540 to make configuration parameters accessible by an administrator. The SDDC manager 225, 227 of the illustrated example allows a component to be plugged in and participate in IP address allocation/reallocation. For example, an IP reallocation service may be accessible via the configuration UI 540 so that a user can call the IP reallocation service upon plugging in a component. The example SDDC manager 225, 227 logs status messages into the SDDC manager data store 542, provides status updates to the configuration UI 540, and provides failure messages to the configuration UI 540. The example SDDC manager 225, 227 allows components (e.g., the example VMware vCenter® virtual infrastructure server 410 of FIG. 4, the example ESXi™ hypervisor component 412 of FIG. 4, the example VMware NSX® network virtualization platform 414 of FIG. 4, the example VMware NSX® network virtualization manager 416 of FIG. 4, the example VMware vSAN™ network data storage virtualization component 418 of FIG. 4, and/or any other physical and/or virtual components) to specify the number of IP addresses required, including zero if none are required. In addition, the example SDDC manager 225, 227 allows components to specify their sequence number which can be used by the SDDC manager 225, 227 during an IP reallocation process to call the components to allocate IP addresses. The example SDDC manager 225, 227 also enables configuration sharing through common objects so that components can obtain new and old IP Addresses of other components. The example SDDC manager 225, 227 stores IP addresses of the components in the SDDC manager data store 542.

In the illustrated example, the operations and management component 406 is in communication with the SDDC manager 225, 227 via the API interface 506 to provide different services such as heat-map service, capacity planner service, maintenance planner service, events and operational view service, and virtual rack application workloads manager service. In the illustrated example, the network virtualization manager 304 and the vCenter server 510 are in communication with the SDDC manager 225, 227 to instantiate, manage, and communicate with virtual networks and virtual infrastructures. For example, the network virtualization manager 304 of the illustrated example may be implemented using the VMware NSX® network virtualization manager 416 of FIG. 4 to virtualize network resources such as physical hardware switches to provide software-based virtual networks. The example vCenter server 510 provides a centralized and extensible platform for managing virtual infrastructures. For example, the vCenter server 510 may be implemented using the VMware vCenter® virtual infrastructure server 410 of FIG. 4 to provide centralized management of virtual hosts and virtual machines from a single console. The vCenter server 510 of the illustrated example communicates with the SDDC manager 225, 227 via the API interface 508 to provide administrators with views of and access to configurations of the hyper-converged infrastructure 206.

The vCenter server 510 of the illustrated example includes an example Single Sign On (SSO) server 552 to enable administrators to access and/or configure the SDDC manager 225, 227. The example SSO server 552 may be implemented using a web browser SSO profile of Security Assertion Markup Language 2.0 (SAML 2.0). In the illustrated example, a SSO user interface of the SSO server 552 is accessible through the example SDDC manager portal 544. In this manner, the SDDC manager 225, 227 is made accessible yet protected using a SSO profile.

Figure 6:
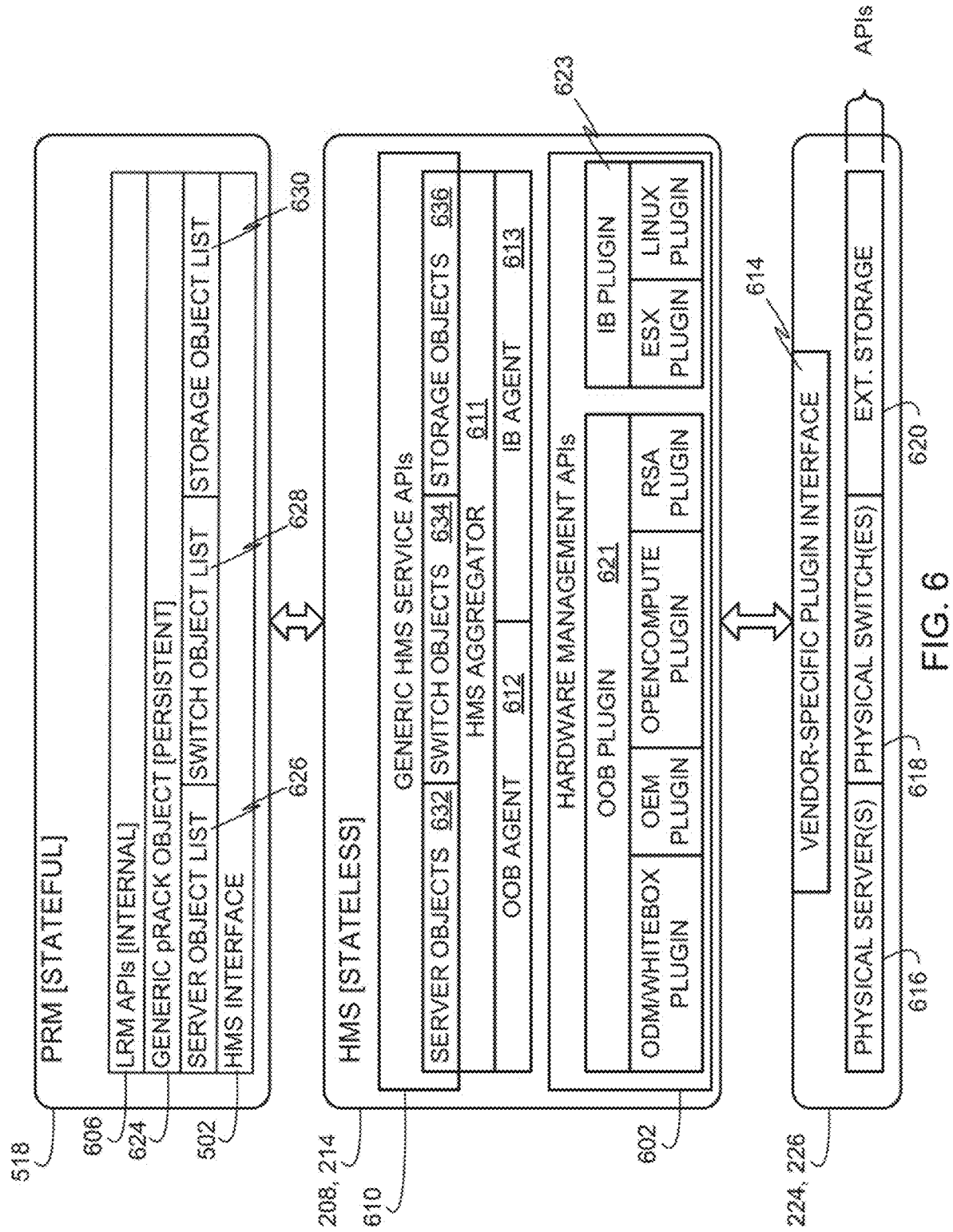
FIG. 6 depicts an example hardware management application program interface (API) of the HMS of FIGS. 2-5 that is between example hardware resources and an example physical rack resource manager (PRM).

FIG. 6 depicts example hardware management application program interfaces (APIs) 602 of the HMS 208, 214 of FIGS. 2-5 that are between the example physical hardware resources 224, 226 of FIGS. 2-5 and the example PRM 518. The example PRM 518 is a component of the SDDC manager 225, 227 (FIGS. 4 and 5) in the software stack of the hyper-converged infrastructure 206 (FIG. 2). An example PRM 518 is provided in each physical rack 202, 204 and is configured to manage corresponding physical hardware resources 224, 226 of the corresponding physical rack 202, 204 (FIG. 2) and to maintain a software physical rack object for the corresponding physical rack 202, 204. The example PRM 518 interfaces with the corresponding HMS 208, 214 of the same physical rack 202, 204 to manage individual physical hardware resources 224, 226. In some examples, the PRM 518 runs an HMS monitor thread (e.g., similar or part of the HMS monitor 428 of FIG. 4) to monitor a management switch 207, 213 that runs the HMS 208, 214 for Type 4 and Type 5 failures shown in Table 1 above. In some examples, the HMS monitor thread in the PRM 518 also monitors for some Type 3 failures shown in Table 1 above when an OS of the management switch 207, 213 needs external intervention.

In the illustrated example, the PRM 518 provides a set of LRM API's 606 for use of the physical rack object (e.g., the generic pRACK object 624 of FIG. 6) by the example LRM 520 (FIG. 5). The example LRM 520 interacts with individual PRM 518 instances to employ physical resources based on physical resource requirements of the LRM 520. In some examples, the PRM 518 runs as part of an LRM application on a given server node in a hyper-converged infrastructure 206. In the illustrated example, the LRM 520 is implemented using Java on Linux. However, any other programming language and any other operating system may be used. The PRM 518 of the illustrated example runs in an x86-based Linux Virtual Machine environment as part of the SDDC manager 225, 227 on a designated server node in the physical rack 202, 204.

In the illustrated example of FIG. 6, the HMS 208, 214 publishes a set of generic HMS service APIs 610 for use by original equipment manufacturers (OEMs) to integrate hardware or software with the software stack of the hyper-converged infrastructure 206. In the illustrated example, the integration point for OEM components is the hardware management APIs 602. In the illustrated example, vendor-specific plugin interfaces 614 may be developed for use by the hardware management API 602 to facilitate communications with physical hardware resources 224, 226 of particular vendors having vendor-specific interfaces. In the illustrated example, such vendor-specific plugin interfaces 614 interface to corresponding physical hardware resources 224, 226 using interface protocols supported by the underlying hardware components (e.g., an IPMI API, a representational state transfer (REST) API, an extensible markup language (XML) API, a hypertext transfer protocol (HTTP) API, a customer information model (CIM) API, etc.). In the illustrated example, the physical hardware resources 224, 226 are shown as one or more physical server(s) 616, one or more physical switch(es) 618, and external storage 620. The physical switches 618 of the illustrated example include the management switch 207, 213 and the ToR switches 210, 212, 216, 218 of FIG. 2.

In the illustrated example, the HMS 208, 214 provides the set of example generic HMS service APIs 610 for use by the PRM 518 to access use of virtual resources based on the physical hardware resources 224, 226. In the illustrated example, the generic HMS service APIs 610 are not specific to any particular vendor and/or hardware and are implemented using a REST/JSON (JavaScript object notation) API protocol. However, any other API protocol may be used. The example generic HMS service APIs 610 act on the underlying physical hardware resources 224, 226, which are encapsulated in a set of software objects such as server objects 632, switch objects 634, and storage objects 636. In the illustrated example, the HMS 208, 214 maintains the server objects 632, the switch objects 634, and the storage objects 636, and their associated properties. In the illustrated example, the HMS 208, 214 runs the generic HMS service APIs 610 on the example server host node (0) 209, 211 (FIG. 2) to interface with the example PRM 518 and to an example HMS aggregator 611. The example HMS aggregator 611 runs on the example server host node (0) 209, 211 to aggregate data from an example OOB agent 612 and an example IB agent 613 to expose such data to the PRM 518 and, thus, the SDDC manager 225, 227 (FIGS. 2, 4, and 5). In addition, the HMS aggregator 611 obtains data from the PRM 518 and parses the data out to corresponding ones of the OOB agent 612 for communicating to the physical hardware resources 224, 226, and to the IB agent 613 for communicating to software components. In the illustrated example, the OOB agent 612 runs on the management switch 207, 213, and the IB agent 613 runs on the server host node (0) 209, 211. The example OOB agent 612 interfaces with the physical resources 224, 226 and interfaces with the HMS aggregator 611. The example IB agent 613 interfaces with operating systems and interfaces with the HMS aggregator 611. That is, in the illustrated example, the OOB agent 612 is configured to communicate with vendor hardware via vendor-specific interfaces. The example IB agent 613 is configured to communicate with OS-specific plugins and does not communicate directly with hardware. Instead, the IB agent 613 communicates with operating systems to obtain information from hardware when such information cannot be obtained by the OOB agent 612. For example, the OOB agent 612 may not be able to obtain all types of hardware information (e.g., hard disk drive or solid state drive firmware version). In such examples, the IB agent 613 can request such hardware information from operating systems.

In examples disclosed herein, server and switch plugin APIs are to be implemented by vendor-supplied plugins for vendor-specific hardware. For example, such server and switch plugin APIs are implemented using OOB interfaces according to an HMS specification. For vendor-specific plugin interfaces 614 that do not support OOB communication based on the vendor-supplied plugin, the HMS 208, 214 implements an IB plugin 623 to communicate with the vendor's hardware via an operating system plugin using IB communications. For example, the IB plugin 623 in the HMS 208, 214 interfaces to the operating system running on the server node (e.g., the server node implemented by the vendor's hardware) using an OS-provided mechanism such as OS APIs (e.g., vSphere APIs), OS command line interfaces (CLI) (e.g., ESX CLI), and/or Distributed Management Task Force (DMTF) Common Information Model (CIM) providers.

The example HMS 208, 214 internally maintains the hardware management API 602 to service API requests received at the generic HMS service APIs 610. The hardware management API 602 of the illustrated example is vendor-specific and is implemented as a vendor-specific plugin to the HMS 208, 214. The hardware management API 602 includes example OOB plugins 621 to interface with vendor-specific plugin interfaces 614 to communicate with the actual physical hardware resources 224, 226. For example, the OOB plugin 621 interfaces with the example OOB agent 612 to exchange data between the generic HMS service APIs 610 and the vendor-specific plugin interface 614. Example vendor-specific interfaces 614 may be proprietary to corresponding OEM vendors for hardware management. Regardless of whether the vendor-specific interfaces 614 are proprietary, or part of an industry standard or open interface, the published hardware management API 602 is configured to work seamlessly between the PRM 518 and the physical hardware resources 224, 226 to manage the physical hardware resources 224, 226. To communicate with the physical hardware resources 224, 226 via operating systems, the hardware management API 602 is provided with an example IB plugin 623. That is, in the illustrated example, the IB plugin 623 operates as an OS plugin for the IB agent 613 to communicate with operating systems.

In the illustrated examples, the HMS 208, 214 uses the example OOB agent 612 and the example OOB plugin 621 for OOB management of the physical hardware resources 224, 226, and uses the example IB agent 613 and the example IB plugin 623 for IB management of the physical hardware resources 224, 226. In examples disclosed herein, OOB components such as the OOB agent 612 and the OOB plugin 621 run in the management switch 207, 213, and IB components such as the IB agent 613, the IB plugin 623, the generic HMS service APIs 610, and the HMS aggregator run 611 in the server host node (0) 209, 211. Such separation of IB management and OOB management components of the HMS 208, 214 facilitates increased resiliency of HMS 208, 214 in case of failure of either of the IB management channel or the OOB management channel. Such IB and OOB management separation also simplifies the network configuration of the ToR switches 210, 212, 216, 218 (FIGS. 2 and 3) and keeps the management network isolated for security purposes. In examples disclosed herein, a single generic API interface (e.g., a REST API, a JSON API, etc.) implementing the example generic HMS service APIs 610 is provided between the PRM 518 and the HMS 208, 214 to facilitate hiding all hardware and vendor specificities of hardware management in the HMS 208, 214 and isolating the complexity of such hardware and vendor specificities from upper layer processes in the PRM 518 and/or a LRM 520.

In examples disclosed herein, the HMS 208, 214 uses an IPMI/DCMI (Data Center Manageability Interface) for OOB management. Example OOB operations performed by the HMS 208, 214 include discovery of new hardware, bootstrapping, remote power control, authentication, hard resetting of non-responsive hosts, monitoring catastrophic hardware failures, and firmware upgrades. In examples disclosed herein, an Integrated BMC (baseboard management controller) Embedded local area network (LAN) channel is used for OOB management of server hosts 616. In examples disclosed herein, one dedicated interface is enabled for OOB management traffic. In such examples, the interface is enabled for dynamic host configuration protocol (DHCP) and connected to a management switch (e.g., the management switch 207, 213 running the HMS 208, 214). In examples disclosed herein, an administrative user is created to operate the dedicated interface for OOB management traffic. An example HMS OOB thread uses IPMI commands to discover and manage server nodes 616 over the dedicated interface for OOB management traffic.

The example HMS 208, 214 uses IB management to periodically monitor status and health of the physical resources 224, 226 and to keep server objects 632 and switch objects 634 up to date. In examples disclosed herein, the HMS 208, 214 uses Distributed Management Task Force (DMTF) Common Information Model (CIM) providers in a VMware ESXi™ hypervisor and CIM client for IB management. The CIM is the software framework used for managing hardware devices and services defined by the DMTF and supported in the VMware ESXi™ hypervisor. CIM providers are classes that receive and fulfill client requests dispatched to them by a CIM object manager (CIMOM). For example, when an application requests dynamic data from the CIMOM, it uses the CIM provider interfaces to pass the request to the CIM provider. Example IB operations performed by the HMS 208, 214 include controlling power state, accessing temperature sensors, controlling BIOS (Basic Input/Output System) inventory of hardware (e.g., CPUs, memory, disks, etc.), event monitoring, and logging events. In examples disclosed herein, the main components that the HMS 208, 214 monitors using IB management are I/O devices (e.g., Network Interface Cards, PCI-e interfaces, and Disk Drives). In examples disclosed herein, the HMS 208, 214 uses CIM providers to monitor such I/O devices. Example CIM providers may be developed as VMware ESXi™ hypervisor userworlds to interface with drivers corresponding to I/O devices being monitored to gather data pertaining to those I/O devices. In some examples, the CIM providers are C++ classes, which define sets of objects and corresponding properties for use by the HMS 208, 214 to fetch data from the underlying physical resources 224, 226 (e.g., hardware I/O devices).

The PRM 518 of the illustrated example exposes a physical rack object and its associated sub-objects in a generic vendor neutral manner to the example LRM 520. Example sub-objects of the physical rack object include an example server object list 626 (e.g., a list of servers), an example switch object list 628 (e.g., a list of switches), and a storage object list 630 (e.g., a list of external storage). The example PRM 518 communicates with the example HMS 208, 214 using the example generic HMS service APIs 610 to manage physical resources (e.g., hardware) in the physical rack 202, 204, and to obtain information and inventory of physical resources available in the physical rack 202, 204. In the illustrated example, the HMS 208, 214 executes instructions from the PRM 518 that are specific to underlying physical resources based on the hardware management APIs 602 of those physical resources. That is, after the HMS 208, 214 receives an instruction via a generic HMS service APIs 610 from the PRM 518 that corresponds to an action on a particular physical resource in the physical rack 202, 204, the HMS 208, 214 uses the example hardware management APIs 602 to issue a corresponding instruction to the particular physical resource using a hardware management API of that particular physical resource. In this manner, the PRM 518 need not be configured to communicate with numerous different APIs of different physical resources in the physical rack 202, 204. Instead, the PRM 518 is configured to communicate with the HMS 208, 214 via the generic HMS service APIs 610, and the HMS 208, 214 handles communicating with numerous different, specific APIs of different physical resources through the example hardware management API 602. By using the generic HMS service APIs 610 for the PRM 518 to interface with and manage physical resources through the HMS 208, 214, the physical racks 202, 204 may be configured or populated with hardware from numerous different manufacturers without needing to significantly reconfigure the PRM 518. That is, even if such manufacturers require use of different APIs specific to their equipment, the HMS 208, 214 is configured to handle communications using such different APIs without changing how the PRM 518 uses the generic HMS service APIs 610 to communicate with the physical resources via the HMS 208, 214. Thus, the separation of the example generic HMS service APIs 610 from the example hardware management API 602 allows the HMS 208, 214 to integrate seamlessly with hardware from ODMs, OEMs, and other vendors independently of the generic HMS service APIs 610 provided by the HMS 208, 214 for use by the PRM 518 to manage such hardware.

The generic HMS service APIs 610 of the illustrated example supports numerous Get/Set events so that the HMS 208, 214 can support requests from the PRM 518. Such Get/Set events will work on software server and switch object properties.

The PRM 518 of the illustrated example registers a set of callbacks with the HMS 208, 214 that the PRM 518 is configured to use to receive communications from the HMS 208, 214. When the PRM callbacks are registered, the HMS 208, 214 invokes the callbacks when events corresponding to those callbacks occur.

The example generic HMS service APIs 610 provide non-maskable event types for use by the HMS 208, 214 to notify the PRM 518 of failure scenarios in which the HMS 208, 214 cannot continue to function.

The HMS 208, 214 provides the example hardware management APIs 602 for use by the example generic HMS service APIs 610 so that the HMS 208, 214 can communicate with the physical resources 224, 226 based on instructions received from the PRM 518 via the generic HMS service APIs 610. The hardware management APIs 602 of the illustrated example interface with physical resource objects using their corresponding management interfaces, some of which may be vendor-specific interfaces. For example, the HMS 208, 214 uses the hardware management APIs 602 to maintain managed server, switch, and storage software object properties.

In the illustrated example of FIG. 6, the PRM 518 maintains an example generic pRack object 624. The example generic pRack object 624 persists a list of the physical resources 224, 226 returned by the HMS 208, 214 and classified according to object types. The example generic pRack object 624 includes the following pRack object definition.

pRACK Object
Rack ID (Logical Provided by SDDC manager 225, 227)
Manufacturer ID ( )
Number Server Objects
Server Object List 626
Switch Object List 628
HMS heartbeat timestamp In the pRack object definition above, the Rack ID is the logical identifier of the hyper-converged infrastructure 206 (FIG. 2). The Manufacturer ID ( ) returns the identifier of the system integrator described in connection with FIG. 1 that configured the hyper-converged infrastructure 206. The 'Number Server Objects' element stores the number of server objects configured for the hyper-converged infrastructure 206. The 'Server Object List' 626 element stores a listing of server objects configured for the hyper-converged infrastructure 206. The 'Switch Object List' 628 element stores a listing of switch objects configured for the hyper-converged infrastructure 206. The 'HMS heartbeat timestamp' element stores timestamps of when the operational status (e.g., heartbeat) of the hyper-converged infrastructure 206 is checked during periodic monitoring of the hyper-converged infrastructure 206.

The example PRM 518 provides the LRM APIs 606 for use by the LRM 520 (FIG. 5) to access the elements above of the pRack object 624. In examples disclosed herein, the PRM 518 and the LRM 520 run in the same application. As such, the PRM 518 and the LRM 520 communicate with each other using local inter-process communication (IPC).

The LRM 520 of the illustrated example registers a set of callbacks with the PRM 518 that the LRM 520 is configured to use to receive communications from the PRM 518. When the LRM callbacks are registered, the PRM 518 invokes the callbacks when events corresponding to those callbacks occur.

The example generic HMS service APIs 610 provide non-maskable event types for use by the HMS 208, 214 to notify the PRM 518 of failure scenarios in which the HMS 208, 214 cannot continue to function.

An example boot process of the hyper-converged infrastructure 206 (FIGS. 2 and 4) includes an HMS bootup sequence, a PRM bootup sequence, and an HMS-PRM initial handshake. In an example HMS bootup sequence, when the management switch 207, 213 on which the HMS 208, 214 runs is powered-on and the OS of the management switch 207, 213 is up and running, a bootstrap script to initialize the HMS 208, 214 is executed to fetch and install an HMS agent software installer on the management switch 207, 213 to instantiate the HMS 208, 214. The HMS agent software installer completes install and initialization of the HMS agent software bundle and starts the HMS agent daemon to instantiate the HMS 208, 214. When the HMS agent daemon is started, the HMS 208, 214 determines the inventory of the physical resources 224, 226 of the physical rack 202, 204. It does this by using an IPMI discover API which sends broadcast remote management control protocol (RMCP) pings to discover IPMI-capable nodes (e.g., nodes of the physical resources 224, 226) on a known internal subnet. In such examples, management IP addresses for server nodes (e.g., server nodes of the physical resources 224, 226) and ToR switches (e.g., ToR switches 210, 212, 216, 218) will be known apriori and published for the HMS 208, 214 to discover as internal DHCP address ranges. For example, the server hosts and the ToR switches 210, 212, 216, 218 may be assigned IP addresses using a DHCP server running on the same management switch 207, 213 that runs the HMS 208, 214.

In an example PRM bootup sequence, the PRM 518 boots up as part of the SDDC manager 225, 227. The example SDDC manager 225, 227 initiates the PRM 518 process. During bootup, the example PRM 518 creates an empty physical rack object and waits for the HMS 208, 214 to initiate an HMS-PRM initial handshake. When the HMS-PRM initial handshake is successful, the example PRM 518 queries the HMS 208, 214 for the physical inventory (e.g., the inventory of the physical resources 224, 226) in the physical rack 202, 204. The PRM 518 then populates the physical rack object based on the physical inventory response from the HMS 208, 214. After the HMS-PRM initial handshake with the HMS 208, 214 and after the physical rack object initialization is complete, the example PRM 518 sends a message to the LRM 520 to indicate that the PRM 518 is ready for accepting requests. However, if initialization does not succeed after a certain time period, the example PRM 518 notifies the LRM 520 that the pRack initialization has failed.

In examples disclosed herein, the HMS 208, 214 initiates the HMS-PRM initial handshake during the PRM bootup sequence to establish a connection with the PRM 518. In examples disclosed herein, when the VM hosting the SDDC manager 225, 227 is up and running the VM creates a virtual NIC for the internal network of the hyper-converged infrastructure 206 and assigns an IP address to that virtual NIC of the internal network. The ToR switch 210, 212, 216, 218 discovers how to reach and communicate with internal network of the SDDC manager 225, 227 when the VM hosting the SDDC manager 225, 227 powers on. In examples disclosed herein, a management port of the management switch 207, 213 is connected to the ToR switches 210, 212, 216, 218. The management port is used to manage the ToR switches 210, 212, 216, 218. In addition, the management switch 207, 213 is connected to the ToR switches 210, 212, 216, 218 over data ports and communicate using an internal VLAN network. The example SDDC manager 225, 227 and the HMS 208, 214 can then communicate based on a predefined IP address/port number combination. For example, the HMS 208, 214 initiates the HMS-PRM initial handshake by sending a message to the predefined IP address/port number combination of the PRM 518, and the PRM 518 responds with an acknowledge (ACK) to the message from the HMS 208, 214 to complete the HMS-PRM initial handshake.

After the HMS bootup sequence, the HMS 208, 214 performs an initial discovery process in which the HMS 208, 214 identifies servers, switches, and/or any other hardware in the physical resources 224, 226 in the physical rack 202, 204. The HMS 208, 214 also identifies hardware configurations and topology of the physical resources in the physical rack 202, 204. To discover servers in the physical resources 224, 226, the example HMS 208, 214 uses IPMI-over-LAN, which uses the RMCP/RMCP+'Remote Management Control Protocol' defined by DMTF. In examples disclosed herein, RMCP uses port 623 as the primary RMCP port and 664 as a secure auxiliary port, which uses encrypted packets for secure communications. The example HMS 208, 214 uses an RMCP broadcast request on a known subnet to discover IPMI LAN nodes. In addition, the HMS 208, 214 uses the RMCP presence ping message to determine IPMI capable interfaces in the physical rack 202, 204. In this manner, by IPMI LAN nodes and IPMI capable interfaces, the HMS 208, 214 discovers servers present in the physical resources 224, 226.

To discover switches in the physical resources 224, 226, a DHCP server running on the management switch 207, 213 assigns management IP addresses to the ToR switches 210, 212, 216, 218. In this manner, the HMS 208, 214 can detect the presence of the ToR switches 210, 212, 216, 218 in the physical rack 202, 204 based on the management IP addresses assigned by the DHCP server.

To maintain topology information of the management network in the hyper-converged infrastructure 206, a link layer discovery protocol (LLDP) is enabled on management ports of the discovered server nodes and ToR switches 210, 212, 216, 218. The example management switch 207, 213 monitors the LLDP packet data units (PDUs) received from all of the discovered server nodes and keeps track of topology information. The example HMS 208, 214 uses the topology information to monitor for new servers that are provisioned in the physical resources 224, 226 and for de-provisioning of servers from the physical resources 224, 226. The example HMS 208, 214 also uses the topology information to monitor server hosts of the physical resources 224, 226 for misconfigurations.

The example HMS 208, 214 is capable of power-cycling individual IPMI-capable server hosts in the physical resources 224, 226 of the physical rack 202, 204. For example, the HMS 208, 214 sends SYS POWER OFF and SYS POWER ON messages to the BMCs on boards of target server hosts via LAN controllers of target server hosts. The LAN controllers for the management ports of server hosts are powered on using stand-by power and remain operative when the hyper-converged infrastructure 206 is powered down. In some examples, the LAN controller is embedded to the system. In other examples, the LAN controller is an add-in PCI card connected to the BMC via a PCI management bus connection.

To hard reset a switch (e.g., the ToR switches 210, 212, 216, 218), the HMS 208, 214 uses IP-based access to power supplies of the physical rack 202, 204. For example, the HMS 208, 214 can hard reset a switch when it is non-responsive such that an in-band power cycle is not possible via the switch's CLI.

During a power cycle, OS images that are pre-stored (e.g., pre-flashed) in the servers and switches of the physical resources 224, 226 are bootstrapped by default. As part of the bootstrap procedure, the HMS 208, 214 points the boot loader to the server or switch image located on a memory device (e.g., a flash memory, a magnetic memory, an optical memory, a Serial Advanced Technology Attachment (SATA) Disk-on-Module (DOM), etc.) and provides the boot loader with any additional parameters pertinent to the bootup of a booting server or switch. For instances in which a network-based boot is required, the HMS 208, 214 is capable of altering boot parameters to use PXE boot for servers and Trivial File Transfer Protocol (TFTP)/Open Network Install Environment (ONIE) for switches.

In examples disclosed herein, after the boot up process the HMS 208, 214 validates that server nodes and the ToR switches 210, 212, 216, 218 have been properly bootstrapped with correct OS images and are ready to be declared functional. The example HMS 208, 214 does this by logging in to the server hosts, validating the OS versions, and analyzing the logs of the server hosts for any failures during bootup. In examples disclosed herein, the HMS 208, 214 also runs basic operability/configuration tests as part of the validation routine. In some examples, the HMS 208, 214 performs a more exhaustive validation to confirm that all loaded drivers are compliant with a hardware compatibility list (HCL) provided by, for example, the virtual system solutions provider (FIG. 1). The example HMS 208, 214 also runs a switch validation routine as part of a switch thread to verify that the boot configurations for the ToR switches 210, 212, 216, 218 are applied. For example, the HMS 208, 214 validates the OS versions in the ToR switches 210, 212, 216, 218 and tests ports by running link tests and ping tests to confirm that all ports are functional. In some examples, the HMS 208, 214 performs more exhaustive tests such as bandwidth availability tests, latency tests, etc.

Further details of the example HMS 208, 214 of FIGS. 2, 3, 4, 5, and/or 6 are disclosed in U.S. patent application Ser. No. 14/788,004, filed on Jun. 30, 2015, and titled "METHODS AND APPARATUS TO CONFIGURE HARDWARE MANAGEMENT SYSTEMS FOR USE IN VIRTUAL SERVER RACK DEPLOYMENTS FOR VIRTUAL COMPUTING ENVIRONMENTS," which is hereby incorporated by herein reference in its entirety. Further details of the example SDDC manager s 225, 227 of FIGS. 2, 4, and/or 5 are also disclosed in U.S. patent application Ser. No. 14/796,803, filed on Jul. 10, 2015, and titled "Methods and Apparatus to Configure Virtual Resource Managers for use in Virtual Server Rack Deployments for Virtual Computing Environments," which is hereby incorporated by reference herein in its entirety. In addition, U.S. patent application Ser. No. 14/788,193, filed on Jun. 30, 2015, and titled "METHODS AND APPARATUS TO RETIRE HOSTS IN VIRTUAL SERVER RACK DEPLOYMENTS FOR VIRTUAL COMPUTING ENVIRONMENTS," and U.S. patent application Ser. No. 14/788,210, filed on Jun. 30, 2015, and titled "METHODS AND APPARATUS TO TRANSFER PHYSICAL HARDWARE RESOURCES BETWEEN VIRTUAL RACK DOMAINS IN A VIRTUALIZED SERVER RACK" are hereby incorporated by reference herein in their entireties.

While an example manner of implementing the example SDDC manager 225, 227 of FIG. 2 is illustrated in FIGS. 2, 4 and 5, one or more of the elements, processes and/or devices illustrated in FIGS. 2, 4 and/or 5 may be combined, divided, re-arranged, omitted, eliminated and/or implemented in any other way. Further, the example workflow services engine 514, the example resource aggregation and correlations engine 516, the example physical resource manager 518, the example logical resource manager 520, the example broadcasting and election manager 522, the example security manager 524, the example asset inventory and license manager 526, the example logical object generation engine 528, the example event process manager 530, the example SDDC directory 532, the example extensibility tools 534, the example configuration component services 536, the example SDDC configuration component 538, the example credentials manager 539, the example configuration UI 540 and/or, more generally, the example SDDC manager 225, 227 of FIGS. 2, 4, and/or 5 may be implemented by hardware, software, firmware and/or any combination of hardware, software and/or firmware. Thus, for example, any of the example workflow services engine 514, the example resource aggregation and correlations engine 516, the example physical resource manager 518, the example logical resource manager 520, the example broadcasting and election manager 522, the example security manager 524, the example asset inventory and license manager 526, the example logical object generation engine 528, the example event process manager 530, the example SDDC directory 532, the example extensibility tools 534, the example configuration component services 536, the SDDC configuration component 538, the example credentials manager 539, the example configuration UI 540 and/or, more generally, the example SDDC manager 225, 227 of FIGS. 2, 4, and/or 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workflow services engine 514, the example resource aggregation and correlations engine 516, the example physical resource manager 518, the example logical resource manager 520, the example broadcasting and election manager 522, the example security manager 524, the example asset inventory and license manager 526, the example logical object generation engine 528, the example event process manager 530, the example SDDC directory 532, the example extensibility tools 534, the example configuration component services 536, the example SDDC configuration component 538, the example credentials manager 539, the example configuration UI 540 and/or, more generally, the example SDDC manager 225, 227 of FIGS. 2, 4, and/or 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example SDDC manager 225, 227 of FIGS. 2, 4, and/or 5 may include one or more elements, processes and/or devices in addition to, or instead of, those illustrated in FIGS. 4 and/or 5, and/or may include more than one of any or all of the illustrated elements, processes and devices.

Figure 7:
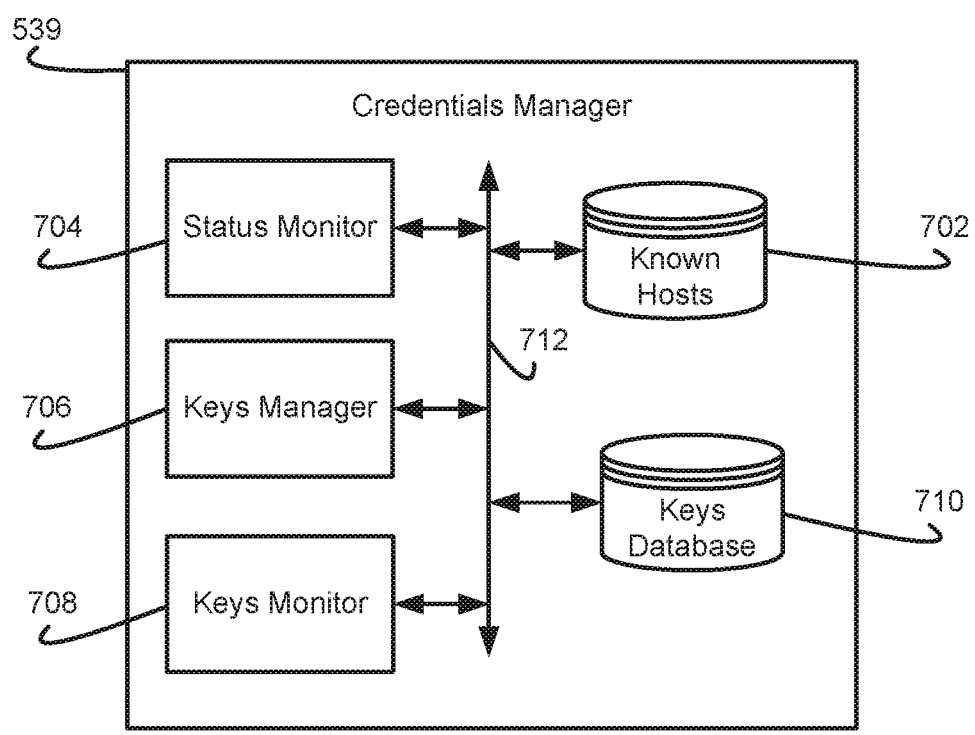
FIG. 7 is a block diagram of an example implementation of the example credentials manager of FIG. 5.

A block diagram of an example implementation of the credentials manager 539 of FIG. 5 is illustrated in FIG. 7. The example credentials manager 539 of FIG. 7 includes an example known hosts file 702, an example status monitor 704, an example keys manager 706, an example keys monitor 708 and an example keys database 710. In the illustrated example of FIG. 7, the known hosts file 702, the status monitor 704, the keys manager 706, the keys monitor 708 and the keys database 710 are all in communication with one another via a bus 712. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

As disclosed herein, the example credentials manager 539 manages credentials of components (e.g., components of the hyper-converged infrastructure 206) that communicate with the SDDC manager 225, 227. In the illustrated example, the SDDC manager 225, 227 communicates with the components of the hyper-converged infrastructure 206 using a secure shell (SSH) communication interface. To facilitate SSH communications, the components of the hyper-converged infrastructure 206 utilize public-private key pairs. Each component has a unique public-private key pair (also referred to herein as a "host key") that is used to authenticate the component to the SDDC manager 225, 227. For example, before the SDDC manager 225, 227 is initialized at the customer site, the RIA 422 retrieves default public keys for the known components. The example RIA 422 then populates the example known hosts file 702 with the default public keys. In the illustrated example of FIG. 7, the known hosts file 702 is a data structure that includes a list of known components (e.g., components of the hyper-converged infrastructure 206) that the respective SDDC manager 225, 227 may access and their corresponding public keys. For example, the first SDDC manager 225 may include a first known hosts file 702 that includes a first list of public keys and the second SDDC manager 227 may include a second known hosts file 702 that includes a second list of public keys different than the first list of public keys. However, other techniques for maintaining the known hosts file 702 may additionally or alternatively be used. The example credentials manager 539 of FIG. 7 rotates (e.g., replaces) the default public keys during the initial installation or start of life of the SDDC manager 225, 227.

In the illustrated example of FIG. 7, the credentials manager 539 includes the status monitor 704 to monitor the status of the SDDC manager 225, 227. For example, the status monitor 704 may determine if the SDDC manager 225, 227 is performing a startup operation (e.g., is initializing the corresponding physical rack 202, 204), has completed a startup operation (e.g., the corresponding physical rack 202, 204 is initialized), needs to be synchronized (e.g., after a reset), etc. In the illustrated example, during the startup process, the example status monitor 704 registers the SDDC manager 225, 227 with the keys monitor 708. The example status monitor 704 also prevents the credentials manager 539 from performing a synchronization operation during the startup operation.

In the illustrated example of FIG. 7, the credentials manager 539 includes the example keys manager 706 to manage public keys available to the credentials manager 539. For example, when the SDDC manager 225, 227 is performing a startup operation (e.g., initializing the corresponding physical rack 202, 204), the example keys manager 706 causes the components of the hyper-converged infrastructure 206 to generate new host keys (e.g., by performing a command, by sending a message, etc.). For example, the keys manager 706 may access the example VMware vCenter® virtual infrastructure server 410 (FIG. 4) using a default public key retrieved from the known hosts file 702. The example keys manager 706 may execute a command (e.g., an SSH key command "ssh-keygen") to cause the VMware vCenter® virtual infrastructure server 410 to generate new credentials (e.g., a new public-private key pair). The component (e.g., the VMware vCenter® virtual infrastructure server 410) stores the private key portion of the new public-private key pair. The example keys manager 706 retrieves the public key portion of the new public-private key pair and stores a copy of the public key with an identifier of the component in the example known hosts file 702.

In the illustrated example of FIG. 7, the credentials manager 539 includes the example keys monitor 708 to monitor and synchronize data (e.g., data pertaining to SDDC management processes to manage the physical resources 224, 226) and/or tasks (e.g., tasks corresponding to SDDC management processes to manage the physical resources 224, 226) across physical racks (e.g., the physical racks 202, 204) so that all SDDC managers 225, 227 across physical racks of the hyper-converged infrastructure have access to data and states across the physical racks. For example, the keys monitor 708 maintains a registry including SDDC managers that register with the keys monitor 708 during the startup process (e.g., during rack initialization). The example keys monitor 708 may also alert an SDDC manager when a change in status (e.g., a startup operation is initiated, a rack is initialized, an SDDC manager is restarted, etc.) is detected by the status monitor 704. For example, the status monitor 704 of the second SDDC manager 227 may notify the keys monitor 708 when the second SDDC manager 227 is performing a startup operation to initialize the second physical rack 204. The example keys monitor 708 may then alert the first SDDC manager 225 of the change in status of the second SDDC manager 227. In some implementations, the keys monitor 708 may be implemented using Apache Zookeeper.

In some instances, the known hosts file 702 may become inaccessible. For example, the known hosts file 702 may become corrupted, may be accidentally removed, etc. Additionally or alternatively, restarting the SDDC manager 225, 227 may cause the known hosts file 702 to be deleted or marked as obsolete. To reduce the risk of losing authentication or communication abilities with the components of the hyper-converged infrastructure 206, the example credentials manager 539 includes the example keys database 710 to store encrypted versions of public keys that are accessible to all SDDC managers 225, 227. For example, when the keys manager 706 retrieves a public key from a component, the keys manager 706 may encrypt the public key and record the encrypted public key in the example keys database 710. In the illustrated example, the keys manager 706 encrypts the public key using a shared key that is provided to all credential managers 539. Unlike the known hosts file 702, which is accessible only to the respective SDDC manager 225, 227 hosting the file 702, the example keys database 710 of FIG. 7 may be accessed by any of the SDDC managers 225, 227 of the hyper-converged infrastructure 206. In some examples, the keys database 710 is maintained by the primary SDDC manager 225, 227.

The example keys database 710 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example keys database 710 may additionally or alternatively be implemented by one or more double data rate (DDR) memories, such as DDR, DDR2, DDR3, mobile DDR (mDDR), etc. The example keys database 710 may additionally or alternatively be implemented by one or more mass storage devices such as hard disk drive(s), compact disk drive(s), digital versatile disk drive (s), etc. While in the illustrated example the keys database 710 is illustrated as a single database, the keys database 710 may be implemented by any number and/or type(s) of databases.

In the illustrated example, when the known hosts file 702 needs to be repopulated, the example keys manager 706 performs a synchronization operation. For example, the keys manager 706 may perform the synchronization operation when the known host file 702 is corrupted, deleted, marked as obsolete, etc. In some examples, the keys manager 706 performs the synchronization operation in response to the SDDC manager 225, 227 restarting. For example, the SDDC manager 225 may restart after the physical rack 202 is initialized. In some examples, the keys manager 706 performs the synchronization operation in response to a change in the known hosts file 702 of a different SDDC manager. For example, the second SDDC manager 227 may discover a new component and add an encrypted public key associated with the component to the keys database 710. The keys manager 706 of the first SDDC manager 225 may then perform the synchronization operation to update the known hosts file 702 of the first SDDC manager 225 to include the public key associated with the new component. In the illustrated example, the keys manager 706 performs the synchronization operation by retrieving the encrypted public keys from the keys database 710, decrypting the retrieved public keys and storing the decrypted public keys in the known hosts file 702. In the illustrated example, the keys manager 706 uses the shared key provided to all credential managers 539 to decrypt the retrieved public keys. In some examples, the keys manager 706 may wipe the known hosts file 702 prior to retrieving the encrypted public keys from the keys database 710. For example, the keys manager 706 may remove the public keys stored in the known hosts file 702, may delete the current version of the known hosts file 702 and create a new version, etc.

While an example manner of implementing the example credentials manager 539 is illustrated in FIG. 7, one or more of the elements, processes and/or devices illustrated in FIG. 7 may be combined, divided, re-arranged, omitted, eliminated and/or implemented in any other way. Further, the example known hosts file 702, the example status monitor 704, the example keys manager 706, the example keys monitor 708, the example keys database 710 and/or, more generally, the example credentials manager 539 of FIG. 5 may be implemented by hardware, software, firmware and/or any combination of hardware, software and/or firmware. Thus, for example, any of the example known hosts file 702, the example status monitor 704, the example keys manager 706, the example keys monitor 708, the example keys database 710 and/or, more generally, the example credentials manager 539 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example known hosts file 702, the example status monitor 704, the example keys manager 706, the example keys monitor 708, the example keys database 710 and/or, more generally, the example credentials manager 539 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example credentials manager 539 of FIG. 5 may include one or more elements, processes and/or devices in addition to, or instead of, those illustrated in FIG. 7, and/or may include more than one of any or all of the illustrated elements, processes and devices.

Figure 8:
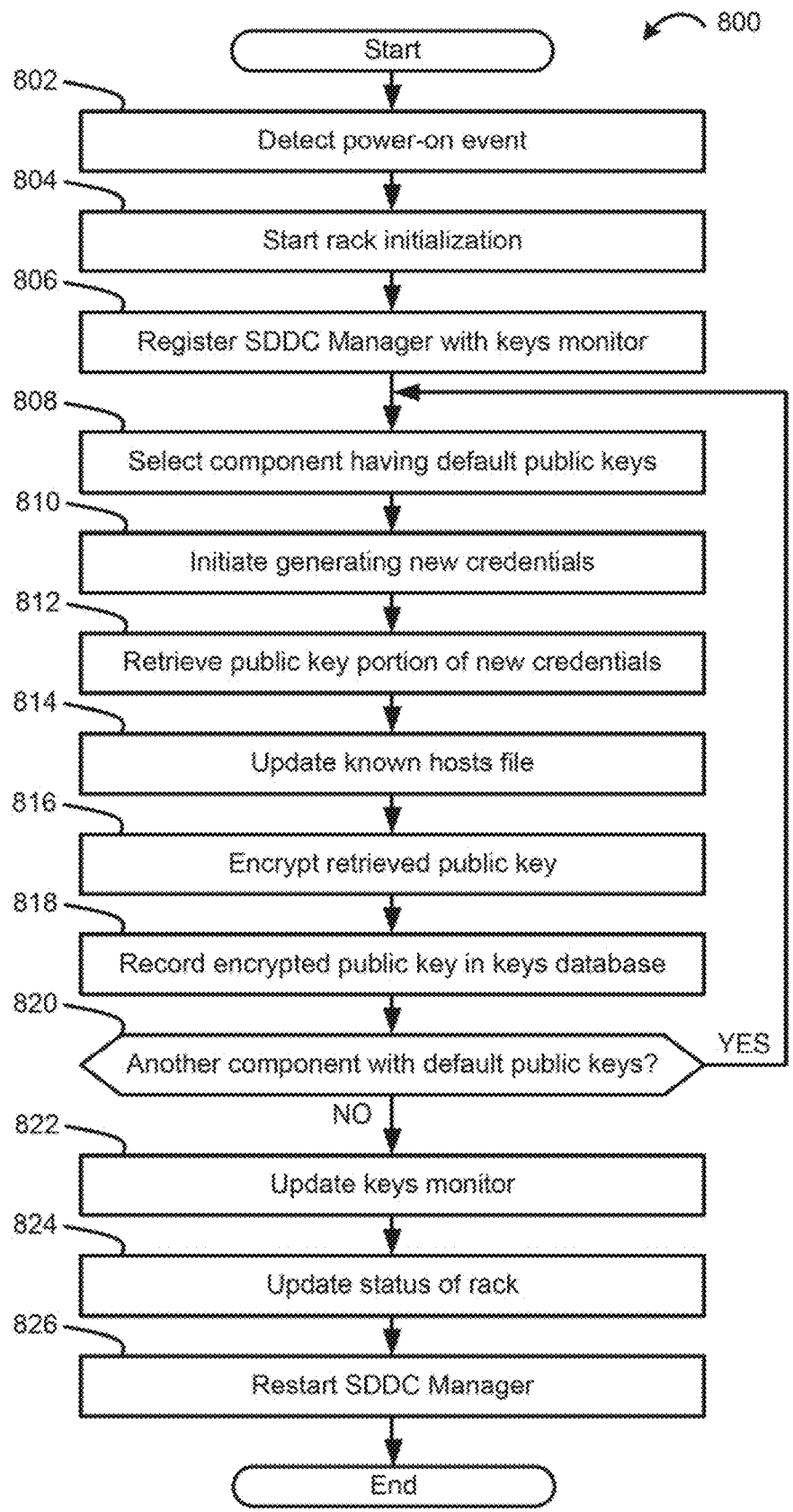
FIG. 8 is a flowchart representative of example computer readable instructions that may be executed by the processing platform of FIG. 11 to implement the example credentials manager of FIGS. 5 and/or 7 to initialize the physical racks of FIGS. 2, 4 and/or 5.
Figure 9:
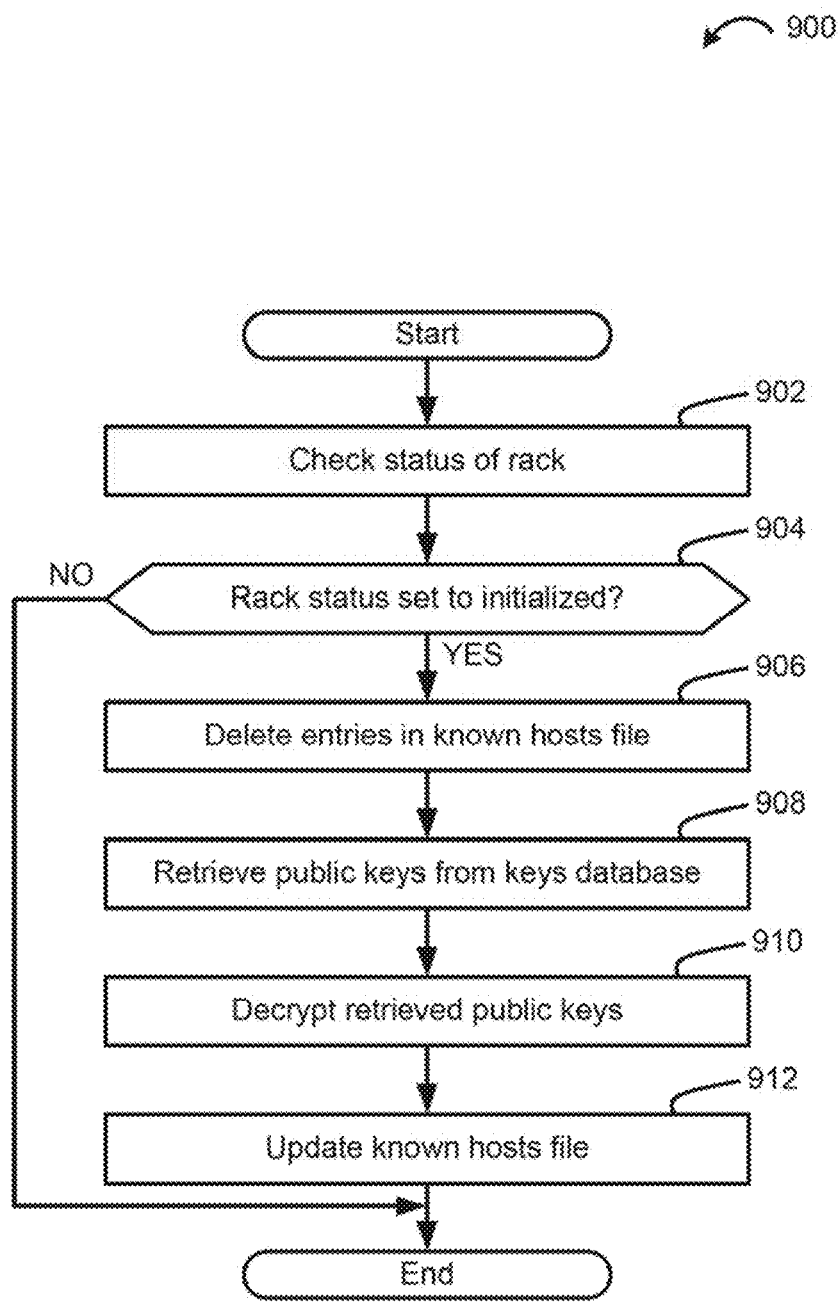
FIG. 9 is a flowchart representative of example computer readable instructions that may be executed by the processing platform of FIG. 11 to implement the example credentials manager of FIGS. 5 and/or 7 to synchronize the example known hosts file of the example credentials manager.
Figure 10:
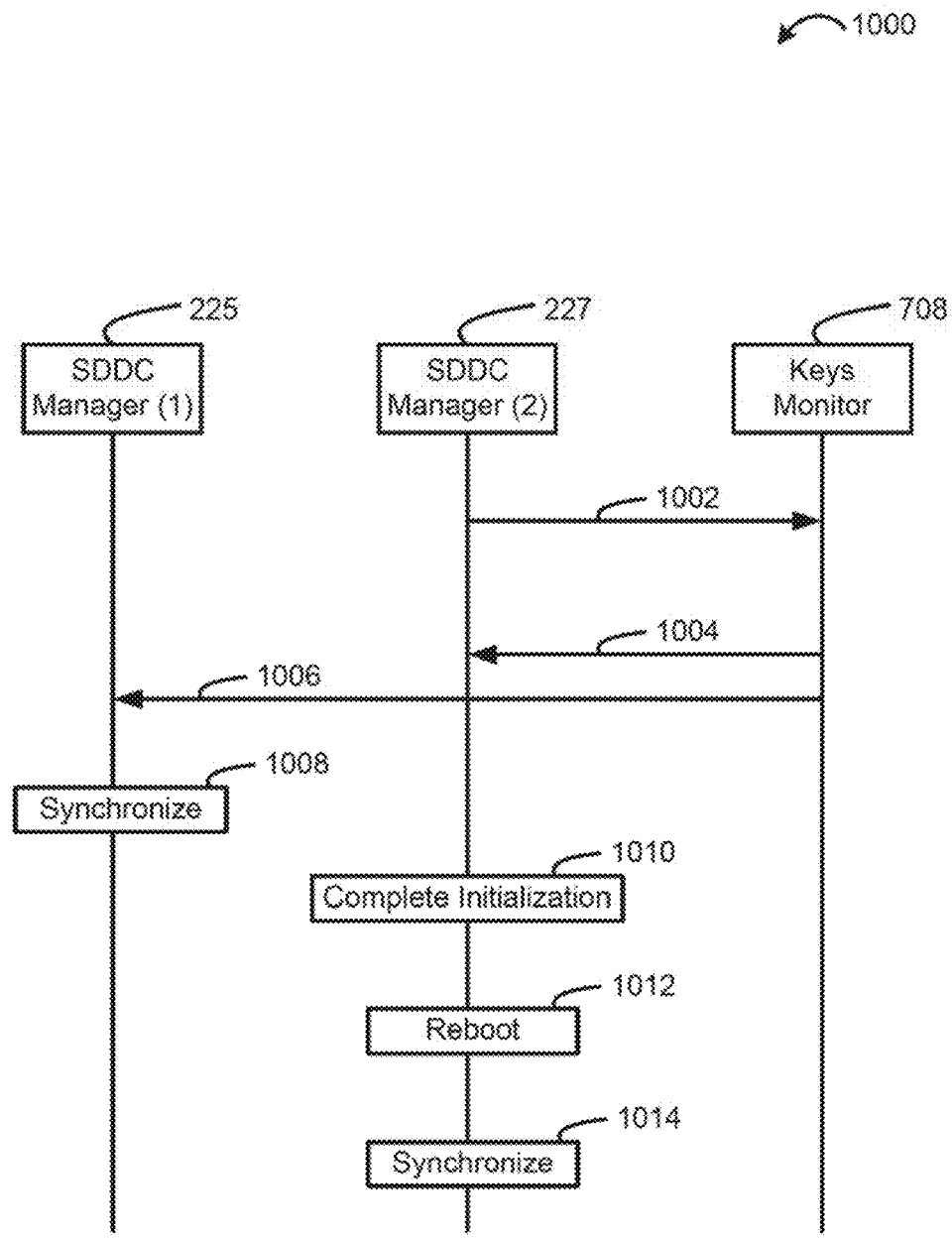
FIG. 10 is a sequence diagram representative of operations performed by the example SDDC managers of FIGS. 2, 4, 5 and/or 7.

Flowcharts representative of example machine readable instructions for implementing the example credentials manager 539 of FIGS. 5 and/or 7 are shown in FIGS. 8, 9 and 10. In these examples, the machine readable instructions comprise a program for execution by a processor such as the processor 1112 shown in the example processor platform 1100 discussed below in connection with FIG. 11. The programs may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIGS. 8, 9 and/or 10, many other methods of implementing the example credentials manager 539 may alternatively be used.

For example, the order of execution of the blocks may be changed, and/or some of the blocks described may be changed, eliminated, or combined.

As mentioned above, the example processes of FIGS. 8, 9 and/or 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8, 9 and/or 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 8 is a flowchart representative of example machine-readable instructions 800 that may be executed by the example credentials manager 539 of FIGS. 5 and/or 7 to facilitate initialization (e.g., a startup operation). The example program 800 of FIG. 8 is described based on the example hyper-converged infrastructure 206 including a single SDDC manager (e.g., the example first SDDC manager 225). The example program 800 of FIG. 8 begins at block 802 when the example credentials manager 539 receives a power-on event for the example physical rack 202. For example, the power-on event may be power being applied to the physical rack 202, an "on" button being depressed, etc. In some examples, the power-on event of block 802 occurs during the initial installation or start of life of the SDDC manager 225. In some examples, the power-on event of block 802 occurs when the SDDC manager 225 boots after being installed on the server host node (0) 209 (FIG. 2).

At block 804, the example status monitor 704 (FIG. 7) starts initialization of the physical rack 202. For example, the status monitor 704 sets the status of the physical rack 202 to initializing (e.g., performing a startup operation). At block 806, the example status monitor 704 registers the SDDC manager 225 with the example keys monitor 708 (FIG. 7).

For example, the status monitor 704 may provide an identifier, an IP address, etc. associated with the SDDC manager 225 to the keys monitor 708. At block 808, the example credentials manager 539 selects a component of which to manage the credentials. For example, the example keys manager 706 may select a component whose default public key is stored in the example known hosts file 702 (FIG. 7). At block 810, the example keys manager 706 causes the selected component to generate new credentials. For example, the keys manager 706 may instruct the selected component to execute the SSH key command "ssh-keygen" to cause the selected component to generate a new public-private key pair.

At block 812, the example keys manager 706 retrieves the public key portion of the new public-private key pair from the selected component. At block 814, the example keys manager 706 updates the known hosts file 702. For example, the keys manager 706 records the retrieved public key in the known hosts file 702. At block 816, the example keys manager 706 encrypts the retrieved public key. For example, the keys manager 706 may encrypt the public keys using a shared key that is provided to all credential managers 539 in the hyper-converged infrastructure 206. At block 818, the example keys manager 706 records the encrypted public key in the example keys database 710 (FIG. 7).

At block 820, the example keys manager 706 determines whether there is another component in the hyper-converged infrastructure 206 for which credentials need to be rotated (e.g., updated from the default credentials). For example, the keys manager 706 may parse the known hosts file 702 to determine whether there is a component whose credentials have not been updated. If, at block 820, the example keys manager 706 determines that there is another component, control returns to block 808 and the component is selected for having its credentials updated.

If, at block 820, the example keys manager 706 determines that there is not another component to select, then, at block 822, the example credentials manager 539 updates the keys monitor 708. For example, the status monitor 704 may send an alert to the keys monitor 708 that the known hosts file 702 has been updated. At block 824, the example status monitor 704 updates the status of the physical rack 202. For example, the status monitor 704 may set the status of the physical rack 202 to initialized. At block 826, the example credentials monitor 539 restarts the SDDC manager 225. The example program 800 of FIG. 8 then ends. Alternatively, control may return to block 802 to wait for another power-on event to initialize an SDDC manager.

FIG. 9 is a flowchart representative of example machine-readable instructions 900 that may be executed by the example credentials manager 539 of FIGS. 5 and/or 7 to facilitate a synchronization operation to synchronize the known hosts file 702 (FIG. 7). For example, the credentials manager 539 may execute the program 900 in response to the SDDC manager restarting (e.g., at block 826 of the program 800 of FIG. 8), in response to determining the known hosts file 702 is inaccessible (e.g., corrupted, deleted, etc.), etc. The example program 900 of FIG. 9 is described based on the example hyper-converged infrastructure 206 including a single SDDC manager (e.g., the example first SDDC manager 225). The example program 900 of FIG. 9 begins at block 902 when the example credentials manager 539 performs a status check of the physical rack 202. For example, the status monitor 704 (FIG. 7) may determine whether the physical rack 202 is in the process of performing a startup operation (e.g., in the process of initializing) and, thus, the SDDC manager 225 may restart at the end of the startup operation. If, at block 904, the example status monitor 704 determines that the physical rack 202 is not initialized (e.g., is performing a startup operation), the example program 900 of FIG. 9 ends.

If, at block 904, the example status monitor 704 determines that the physical rack 202 is initialized (e.g., is not performing a startup operation), then, at block 906, the example credentials manager 539 deletes entries in the known hosts file 702. For example, the keys manager 706 (FIG. 7) may remove the public keys stored in the known hosts file 702, may delete the current version of the known hosts file 702 and create a new version, etc. At block 908, the example credentials manager 539 retrieves public keys from the keys database 710 (FIG. 7). For example, the keys manager 706 may retrieve encrypted public keys from the keys database 710.

At block 910, the example keys manager 706 decrypts the retrieved public keys. For example, the keys manager 706 may use a shared key provided to all credential managers 539 to decrypt the retrieved public keys. At block 912, the example keys manager 706 updates the example known hosts file 702. For example, the keys manager 706 may record the decrypted public keys in the known hosts file 702. The example program 900 of FIG. 9 then ends. Alternatively, control may return to block 902 to wait to initiate another synchronization operation. In some examples, if the synchronization operation resulted in the credentials manager 539 updating the keys database 710, the example credentials manager 539 notifies the keys monitor 708 of the update.

FIG. 10 is a sequence diagram 1000 representative of operations performed by the example SDDC managers 225, 227 of FIGS. 2, 4 and/or 5, and/or the example credentials manager 539 of FIGS. 5 and/or 7. The example sequence 1000 of FIG. 10 begins when the second SDDC manager 227 sends a message 1002 to the example keys manager 706 to notify the keys monitor 708 of a change in the keys database 710. For example, the message 1002 may be sent by the keys manager 706 after all keys for the components of the hyper-converged infrastructure 206 have been rotated at block 822 of the program 800 of FIG. 8.

The example keys monitor 708 then sends a synchronization event 1004, 1006 to all SDDC managers in the hyper-converged infrastructure 206. For example, the keys monitor 708 may send the synchronization event 1006 to the first SDDC manager 225 to notify the first SDDC manager 225 that the example keys database 710 was updated by the second SDDC manager 227. The first SDDC manager 225 then performs a synchronization operation (block 1008) to update its instance of the known hosts file 702 to include the new public keys added by the second SDDC manager 227 to the example keys database 710. For example, the credentials manager 539 of the first SDDC manager 225 may retrieve encrypted public keys from the example keys database 710, may decrypt the retrieved public keys and record the decrypted public keys in the example known hosts file 702 of the first SDDC manager 225. An example implementation of the synchronization operation is disclosed in connection with the example program 1000 of FIG. 10.

The second SDDC manager 227 completes initializing at block 1010. In the example sequence diagram 1000 of FIG. 10, the second SDDC manager 227 completes initializing after the first SDDC manager 225 completes the synchronization operation. However, the second SDDC manager 227 may complete the startup operation at any time during the sequence diagram after the initial message 1002 updating the keys monitor 708 is sent. The second SDDC manager 227 then reboots after the startup operation is complete (block 1012). The example second SDDC manager 227 then performs a synchronization operation (block 1014) to update its instance of the known hosts file 702 to include the public keys that were previously added by the first SDDC manager 225 and/or other SDDC managers to the keys database 710. The example sequence 1000 of FIG. 10 is then repeated periodically and/or aperiodically to synchronize the instances of the known hosts file in the hyper-converged infrastructure 206 including multiple SDDC managers.

Figure 11:
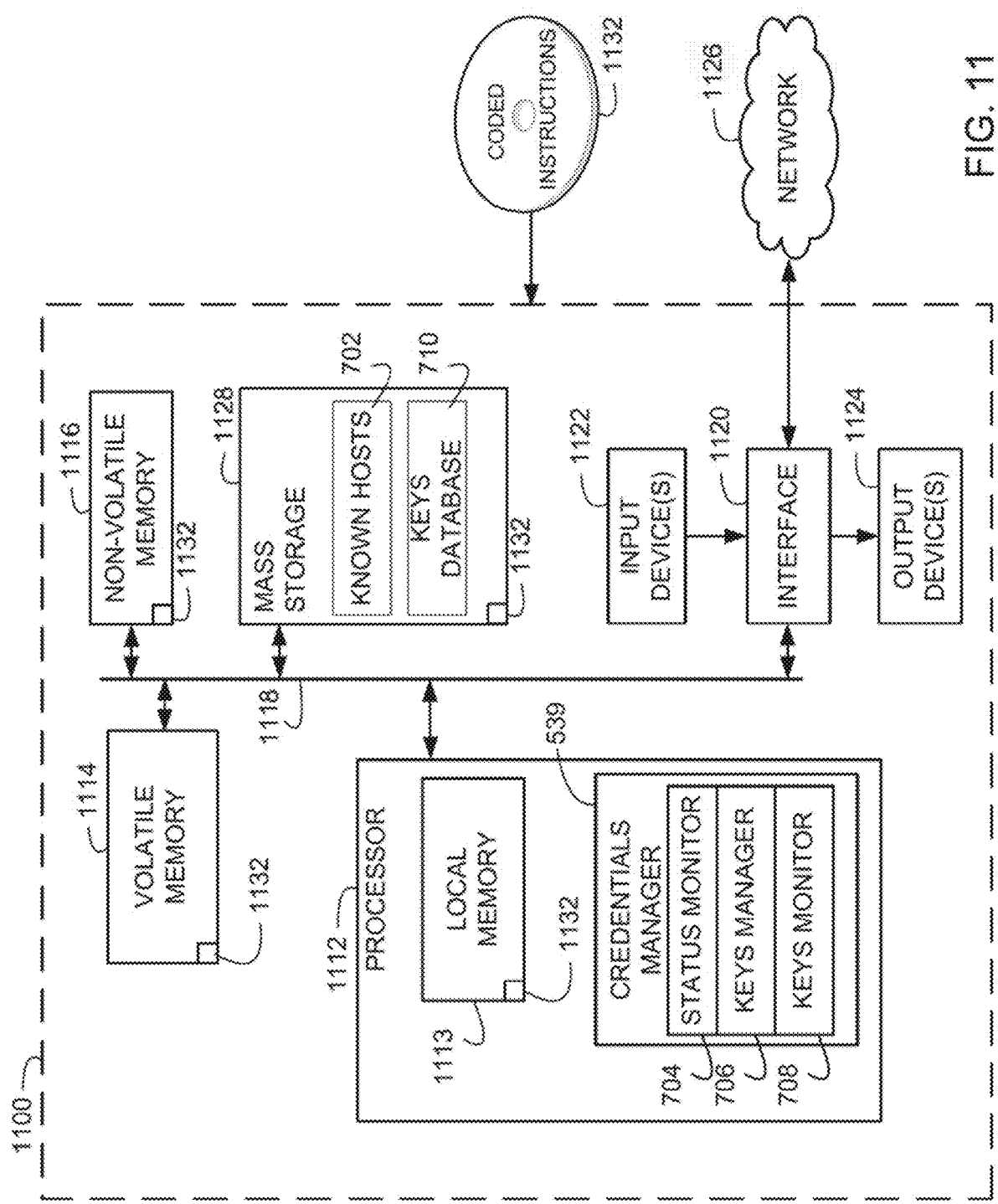
FIG. 11 is a block diagram of an example processing platform capable of executing the example machine-readable instructions of FIGS. 8, 9 and/or 10 to implement the example credentials manager of FIGS. 5 and/or 7.

FIG. 11 is a block diagram of an example processor platform 1100 capable of executing the instructions of FIGS. 8, 9 and/or 10 to implement the example credentials manager 539 of FIGS. 5 and/or 7. The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The processor 1112 can be used to implement the example credentials manager 539, the example status monitor 704, the example keys manager 706 and/or the example keys monitor 708 of FIGS. 5 and/or 7.

The processor 1112 of the illustrated example includes a local memory 13 (e.g., a cache), and executes instructions to implement the example credentials manager 539 or portions thereof. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include flash devices, floppy disk drives, hard drive disks, optical compact disk (CD) drives, optical Blu-ray disk drives, RAID systems, and optical digital versatile disk (DVD) drives. In some examples, the mass storage 928 can be used to implement the known hosts file 702 and/or the keys database 710 of FIG. 7.

Coded instructions 1132 representative of the example machine readable instructions of FIGS. 8, 9 and/or 10 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, systems, apparatus and articles of manufacture provide advantages in the area of software defined data center and, more particularly, in the area of software defined data centers that support virtual machines, storage and networks using physical devices that span across multiple physical racks. For example, the example SDDC manager disclosed herein includes a credentials manager having an instance of a known hosts file. Each instance of the known hosts file includes resources and corresponding credentials to enable the SDDC manager to communicate with a respective resource using a strict host key checking mechanism. To ease the burden of manually replacing the default credentials at a customer site, the disclosed credentials manager automates rotating the credentials information. For example, in response to a power-on event, the example credentials manager automatically (e.g., without user input) causes the resources to create new credentials and updates the instance of the known hosts file installed on the SDDC manager with the new credentials.

The disclosed examples also include a keys database that facilitates a shared data store that is accessible to each of the SDDC managers in the hyper-converged infrastructure. In the illustrated examples, the keys database records encrypted versions of the credentials, which may be used to repopulate an instance of a known hosts file installed on an SDDC manager. Additionally, when a change to the keys database is detected (e.g., new resource and credentials information is recorded in the keys database, etc.), the credentials managers of the respective SDDC managers perform a synchronization operation to update the contents of the instance of the known hosts file installed on the respective SDDC manager. In this manner, communicating via a strict host key mechanism may be implemented, which may reduce the risk of successful attacks (e.g., unauthorized accesses) on the hyper-converged infrastructure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage credentials in a hyper-converged infrastructure, the apparatus comprising:
   a credentials manager to establish a communication between a software defined data center manager of the hyper-converged infrastructure and a component of the hyper-converged infrastructure using first credentials included in a known hosts file, the credentials manager including, at least:
a keys manager to:
generate a public-private key pair at the component in response to a power-on event detected by the software defined data center manager;
record a public key portion of the public-private key pair in the known hosts file;
encrypt the public key portion of the public-private key pair using a shared key stored in the credentials manager, a private key portion of the public-private key pair stored at the component;
record the encrypted public key portion of the public-private key pair in a keys database;
in response to deleting the known hosts file, retrieve the encrypted public key portion of the public-private key pair from the keys database; and
record a decrypted public key portion of the public-private key pair in a new known hosts file.

2. The apparatus of claim 1, wherein the keys manager is to encrypt the public key portion of the public-private key pair at the software defined data center manager.

3. The apparatus of claim 2, wherein to synchronize the known hosts file the keys manager is to, after retrieving the encrypted public key portion of the public-private key pair from the keys database, decrypt the retrieved public key portion of the public-private key pair.

4. The apparatus of claim 3, wherein the keys manager is to synchronize the known hosts file in response to a change detected in the keys database.

5. The apparatus of claim 3, wherein the keys manager is to synchronize the known hosts file in response to a reboot event of the software defined data center manager.

6. The apparatus of claim 3, wherein the keys manager is to synchronize the known hosts file in response to a determination that the known hosts file is unavailable.

7. The apparatus of claim 1, wherein the shared key stored in the credentials manager is accessible by a second credentials manager.

8. A method to manage credentials in a hyper-converged infrastructure, the method comprising:
establishing, by executing an instruction with at least one processor, a communication between a software defined data center manager of the hyper-converged infrastructure and a component of the hyper-converged infrastructure using first credentials included in a known hosts file;
generating, by executing an instruction with the at least one processor, a public-private key pair at the component in response to a power-on event detected by the software defined data center manager;
recording, by executing an instruction with the at least one processor, a public key portion of the public-private key pair in the known host file;
encrypting the public key portion of the public-private key pair using a shared key stored in a credentials manager, a private key portion of the public-private key pair stored at the component;
recording the encrypted public key portion of the public-private key pair in a keys database;
in response to deleting the known hosts file, retrieving, by executing an instruction with the at least one processor, the encrypted public key portion of the public-private key pair from the keys database; and
recording, by executing an instruction with the at least one processor, a decrypted public key portion of the public-private key pair in a new known hosts file.

9. The method of claim 8, wherein the public key portion of the public-private key pair are encrypted at the software defined data center manager.

10. The method of claim 9, further including synchronizing the known hosts file by, after retrieving the encrypted public key portion of the public-private key pair from the keys database, decrypting the retrieved credentials.

11. The method of claim 10, wherein the synchronizing of the known hosts file is performed in response to a change detected in the keys database.

12. The method of claim 10, wherein the synchronizing of the known hosts file is performed in response to a reboot event of the software defined data center manager.

13. The method of claim 10, wherein the synchronizing of the known hosts file is performed in response to determining the known hosts file is unavailable.

14. The method of claim 8, wherein the shared key stored in the credentials manager is accessible by a second credentials manager.

15. A non-transitory computer readable storage medium comprising instructions that, when executed, cause a machine to at least:
establish a communication between a software defined data center manager of the hyper-converged infrastructure and a component of the hyper-converged infrastructure using first credentials included in a known hosts file;
generate a public-private key pair at the component in response to a power-on event detected by the software defined data center manager;
record a public key portion of the public-private key pair in the known host file;
encrypt the public key portion of the public-private key pair using a shared key stored in a credentials manager, a private key portion of the public-private key pair stored at the component;
record the encrypted public key portion of the public-private key pair in a keys database;
in response to deleting the known hosts file, retrieve the encrypted public key portion of the public-private key pair from the keys database; and
record a decrypted public key portion of the public-private key pair in a new known hosts file.

16. The non-transitory storage medium of claim 15, wherein the instructions, when executed, further cause the machine to encrypt the public key portion of the public-private key pair at the software defined data center manager.

17. The non-transitory storage medium of claim 16, wherein to synchronize the known hosts file, the instructions, when executed, further cause the machine to, after retrieving the encrypted public key portion of the public-private key pair from the keys database, decrypt the retrieved credentials.

18. The non-transitory storage medium of claim 17, wherein the instructions, when executed, further cause the machine to synchronize the known hosts file in response to a change detected in the keys database.

19. The non-transitory storage medium of claim 17, wherein the instructions, when executed, further cause the machine to synchronize the known hosts file in response to a reboot event of the software defined data center manager.

20. The non-transitory storage medium of claim 17, wherein the instructions, when executed, further cause the machine to synchronize the known hosts file in response to a determination that the known hosts file is unavailable.

21. The non-transitory storage medium of claim 15, wherein the shared key stored in the credentials manager is accessible by a second credentials manager.

* * * * *